US012558643B1

(12) United States Patent
Chaudhuri et al.

(10) Patent No.: US 12,558,643 B1
(45) Date of Patent: Feb. 24, 2026

(54) IoT ENABLED SMART FILTER DEVICE

(71) Applicants:Sid Chaudhuri, East Brunswick, NJ (US); Robert Reid, Browns Mills, NJ (US); Gavin Edward Trutzenbach, Browns Mills, NJ (US)

(72) Inventors: Sid Chaudhuri, East Brunswick, NJ (US); Robert Reid, Browns Mills, NJ (US); Gavin Edward Trutzenbach, Browns Mills, NJ (US)

(73) Assignee: Pollux Technologies, East Brunswick, NJ (US)

( * ) Notice: Subject to any disclaimer, the term of this patent is extended or adjusted under 35 U.S.C. 154(b) by 0 days.

(21) Appl. No.: 18/518,523

(22) Filed: Nov. 23, 2023

(51) Int. Cl.
B01D 46/42 (2006.01)
B01D 46/00 (2022.01)

(52) U.S. Cl.
CPC ....... B01D 46/429 (2013.01); B01D 46/0086 (2013.01); B01D 46/4254 (2013.01); B01D 2279/50 (2013.01)

(58) Field of Classification Search
None
See application file for complete search history.

(56) References Cited

U.S. PATENT DOCUMENTS 3,324,633 A * 6/1967 Revell .................... B01D 25/32
96/417
5,141,309 A * 8/1992 Worwag ................ A47L 9/2894
96/417

5,311,023 A * 5/1994 Means, Jr. ............. B01D 46/44
250/341.7
6,104,032 A * 8/2000 Means ................... G01N 21/88
250/341.7
7,012,685 B1 * 3/2006 Wilson ............... B01D 46/0086
356/432
8,744,780 B2 * 6/2014 Wilson, Jr. ............. G01N 21/59
702/33
9,937,453 B2 * 4/2018 Baek ...................... F24F 8/108
10,639,577 B1 * 5/2020 Wilson, Jr. ............... F24F 11/39
10,821,388 B2 * 11/2020 Alderman .......... B01D 46/0086
12,157,080 B2 * 12/2024 Ramphal ................. F24F 13/28
12,290,776 B2 * 5/2025 Yang ................... B01D 46/2403
2016/0121251 A1 * 5/2016 Baek ...................... F24F 8/108
96/417
2022/0331729 A1 * 10/2022 Abu-Saymeh ......... B01D 46/46
2023/0213428 A1 * 7/2023 Khanna ............. G01N 15/0625
356/326

* cited by examiner

*Primary Examiner* — Brit E. Anbacht

(57) ABSTRACT

The present invention provides a smart air filter blockage detection and alert communication system for use with filters in air circulation systems such as HVAC, vehicles, server systems, and dryers. The system attached to the frame of a filter comprises a light source, a light sensor, two actuators and a control unit. The control unit based on a stored program or an external command activates the actuators to place the source and the sensor devices attached to the two arms of the actuators on the two sides of the filter membrane. The sensor measures the light intensity transmitted through the filter. The control unit upon receiving the intensity data determines the filter blockage level and communicates alert to the user when the blockage exceeds a predetermined value. The system uses a 4G or a 5G IoT network capability for data collection and communication with servers and user devices.

28 Claims, 14 Drawing Sheets

Figure 6

IoT ENABLED SMART FILTER DEVICE

FIELD OF THE INVENTION

This invention generally relates to air filters to capture airborne particulates in systems such as HVAC (Heating, Ventilation and Airconditioning), vehicles, dryers, and computer and server systems, and specifically to generate alerts to replace or clean the filters based on adjustable and predetermined filter blockage criteria and to communicate the alert to the users using IoT (Internet of Things) capability of the 4G and 5G wireless networks.

BACKGROUND OF THE INVENTION

This invention relates to an air filter system that generates and communicates an alert to the user when the blockage of the filter due to accumulated particles reaches an adjustable predetermined threshold.

Air filters are used in a variety of systems to trap and remove undesirable particulates from an air stream in an air circulation system. Air filters are typically installed in the path of the air stream contained in an enclosure, conduit or duct in the air circulation system to capture dust and other undesirable particulates and to allow clean air to flow into the system. Examples of such applications include HVAC systems at residential and commercial buildings, vehicles, dryers, computer/server systems, and manufacturing equipment.

A filter structure includes a frame in which a semipermeable membrane is attached. The structure of the frame can be a simple frame like a picture frame. Some filters may have more elaborate shapes. For example, a vehicle filter may have an accordion-like frame in which multiple fins or membranes are attached so that air passes through all of them increasing the level of cleanliness of the air that passed through such multi-membrane filters. A filter can have a circular shape in which membranes are attached in a cylindrical pattern. The filter membrane is made from a variety of materials including paper, cloth, plastic fibers, and other synthetic fibers.

As more air passes through a filter over time more debris is accumulated in the filter resulting in significant blockage of the airflow through the filter. The blockage of the filter causes air flow to diminish and to reduce the effectiveness of the air circulation system. Additionally, a clogged filter may dislodge some of the captured debris into the area for which the filter is used to supply clean air resulting in adverse health effects on users.

As a result, air filters used in air circulation systems need to be replaced or cleaned when there is significant blockage. Typically filter manufacturers recommend a certain period of usage when the filters should be replaced or cleaned. For example, it is recommended that residential HVAC system filters are replaced every three months. The recommendations are based on average usage conditions. It does not consider the specific situations such as ambient air quality, health requirements for specific users such as allergy, seasonal usage time, etc. In addition, users must remember when the replacements are due and carry out the replacements accordingly. Quite often users forget. Consequently, filters are generally replaced prematurely or too late for most effective operation of the air circulation systems.

Attempts have been made previously to provide more effective air filter systems addressing the problems mentioned above. Examples of such attempts are found in the U.S. Pat. Nos. 4,751,501, 5,772,711, 6,052,058, 6,320,513, 6,412,435, 6,443,010, 7,261,762, 7,726,186, 8,314,710, 9,080,784, 9,366,448, and 10,513,997. These systems require measurement of the differential airflows on two sides of a filter, detection of airflow reduction compared to a baseline airflow, measurement of noise created by a whistle installed in the filter that creates noise or vibration when sufficiently blocked, detection of back pressure caused by resistance to airflow when the filter is clogged, detection in rise of the temperature of an equipment not receiving sufficient airflow due to a clogged filter, etc. Some of the systems provide means for generating alert in the form of a sound signal such as a whistle or a light indicator. Other systems provide alerts that a filter needs to be replaced. There are several drawbacks of these systems. First, the devices to detect filter blockage by means of airflow, sound, or pressure differential etc. are not very accurate. Second, the alerts are generated based on a fixed amount of blockage that cannot be adjusted according to the needs of specific users. Third, users still need to actively look for alerts for filter replacements. The inventions of U.S. Pat. Nos. 10,864, 471 and 11,235,272 removed these drawbacks and provided a filter blockage detection and alert communication system that is accurate in blockage detection and adjustable to generate filter replacement alerts based on criteria according to a specific user's requirements, and that is smart in communicating with the users. However, the systems still lack the capability to distinguish filter blockage caused by soil particles of different sizes. The industry standards specify filter efficiencies for different soil particle size ranges to determine the overall effectiveness of a filter. For example, the American Society of Heating, Refrigerating and Air-Conditioning Engineers (ASHRAE) in the ANSI/ ASHRAE Standard 52.2-2017, "Method of Testing General Ventilation Air-Cleaning Devices for Removal Efficiency by Particle Size," specified filter rating known as MERV (Minimum Efficiency Reporting Value) calculated from the measured composite average particle size removal efficiencies (PSE) in the three particle size ranges, 0.3-1, 1-3, and 3-10 $\mu$m. In addition, the device proposed in the above patents may be difficult to install in some HVAC systems.

Thus there is a need for a filter blockage detection and alert communication system that is accurate in blockage detection and adjustable to generate filter replacement alerts based on criteria according to a specific user's requirements, that is smart in communicating with the users, that is capable of characterizing particle size dependent soil deposition, and that is easy to install in HVAC systems.

SUMMARY OF THE INVENTION

The present invention provides systems and methods for accurately detecting blockage of air filters used in a variety of systems including residential and commercial HVAC systems, vehicles, dryers, and computer and server systems. The present invention further provides alerts to users for timely replacement of clogged filters.

In accordance with the present invention, a filter detection and alert communication system comprises a housing, one or more light sources, one or more light sensors, a control unit, and one or more actuators. Light sources of different wavelengths are used to determine PSE in different particle size ranges. The control unit may include a logic circuit, a central processing unit (CPU) or a microcontroller unit (MCU) and a memory. The light sources, the light sensors, and the actuators are coupled to the control unit. The housing incorporating the light sources, light sensors, actuators and the control unit is attached to the frame of a filter either by means of brackets or clips. The control unit activates the actuators to extend the actuator arms based on an external command or the execution of a program logic stored in the memory. The light sources and the sensors are attached at the ends of two actuator arms of the one or more actuators. The actuators can also actuate a part of a housing for the system, for example, to open a door or a cover of the housing.

In one aspect of the invention, the control unit turns on the light sources and activates the sensors after the sources and sensors are placed on the opposite sides of the filter membrane. The light sensors measure the intensity of light received at the sensors. The control unit receives the received light intensity data from the sensors. Once the measurement is completed the actuators pull in the actuator arms along with the light sources and the sensors into the housing so that the filter is no longer blocked by the sources and the sensors.

In another aspect of the invention, the control unit is programmed to periodically activate the actuators and to measure the light intensity transmitted through the filter. The control unit can also activate the actuators and direct the light sensors to measure the light intensity transmitted through the filter upon receiving an external command. The control unit processes the measured intensity data to determine if the filter has reached a blockage threshold stored in the memory of the control unit. The control unit may perform data analysis such as averaging of multiple data points for the determination of reaching the threshold. The control unit is coupled with a wireless network for communication with the user devices.

In yet another aspect of the invention, the control unit is coupled with a server computer via a wireless network such as a 4G or a 5G cellular network with IoT capability or a WiFi network. The control unit sends light intensity data received from the light sensors along with its identification (ID) to the server computer using the IoT network capability. The server computer processes the received light intensity data to determine whether the filter blockage has reached a predetermined threshold. If so, the server computer sends an alert message to a user's device such as a mobile phone.

In yet another aspect of the invention, a server computer collects filter blockage data, their location data and ID from a plurality of smart air filter devices coupled with the server computer via IoT enabled wireless networks or a combination of WiFi and cellular networks. The server computer determines when the filter needs to be replaced or cleaned based on a predetermined threshold of blockage for each of the filters and schedules service with the service providers for filter replacement service. For example, a car service center can set up appointments with its customers based on the alerts received from the server computer. Additionally, the server computer can perform statistical data analysis from a set of smart filter devices in a given geographic region based on the location data to determine an average lifecycle of the filters in the region. Based on this determination a car manufacturer can set the filter replacement recommendation tailored to the specific geographic areas that depend on the air quality in the region or seasonal dependence of the air quality in the region. A car manufacturer can use the statistical data to design and install filters tailored to the needs of the geographical regions.

In yet another aspect of the invention, multiple light sources are used with varying wavelengths. A single sensor having the dynamic wavelength sensing range covering the entire range of all the light sources or multiple sensors to cover the entire range are used in the sensing device. Each of the sensors is turned on one at a time by the controller and the transmitted light intensity is measured for each wavelength. PSE is determined by analyzing the wavelength dependence of the transmitted light intensity data. A more accurate filter replacement criteria is determined using the particle size dependent characterization of the soil deposited on the filter.

In yet another aspect of the invention, the source device and the sensor device are placed in two physically separate device enclosure components of the filter detection and alert communication system. Other components of the filter detection and alert communication system are placed appropriately for the system to function as a single unit. The two enclosure components are placed inside the HVAC duct frame on two sides of the filter. The source device and the sensor device are coupled by thin wires preferably insulated into a thin flat ribbon which can pass through underneath or above the filter without creating any significant air gap. The enclosure structure and placement of the components of the filter detection and alert communication system in the two enclosure components of the invention allows the filter device to be installed without having to drill any holes for the actuator arms to move from the device onto different locations with respect to the filter.

BRIEF DESCRIPTION OF THE DRAWINGS

FIG. 6 depicts a schematic diagram of the salient components of a communication system.

DETAILED DESCRIPTION

Figure 1:
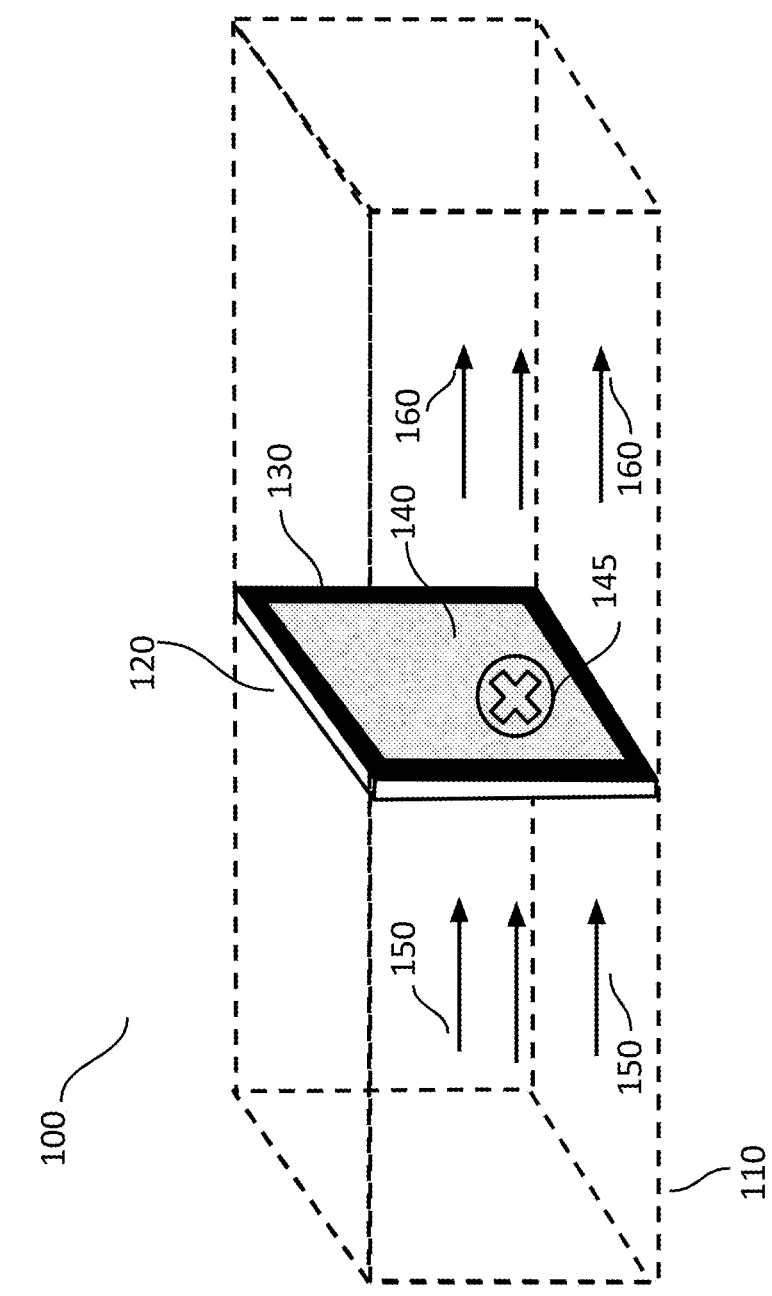
FIG. 1 depicts a schematic diagram of the salient components of an air filter circulation system including an air filter and a conventional blockage detection device.

FIG. 1 depicts the salient components of an air circulation system 100. An air filter 120 is installed in an air duct 110. The air filter comprises a frame 130 on which a filter membrane 140 is attached. The filter membrane is a semipermeable medium made from a variety of materials including paper, cotton fabric, and synthetic fiber. A motorized fan (not shown) causes outside air to flow as an incoming air stream 150 into the duct 110. Air from the incoming flow 150 passes through the filter 120 and flows out as outgoing air stream 160. Dust and other particulates in the incoming stream 150 are captured by the filter 120 and cleaner air goes out into the outgoing stream 160. Over a period of time as more air passes through the filter 120 more particulates are deposited into the filter 120 and more the filter is blocked rendering the filter less effective. A conventional blockage detection device such as a whistle 145 makes noise based on the differential pressure between the incoming flow 150 and outgoing flow 160 caused by the blockage. The noise is used as an alert for replacing or cleaning the filter 120. Other conventional means of blockage detection may include measurement of the differential air pressure.

Figure 2A:
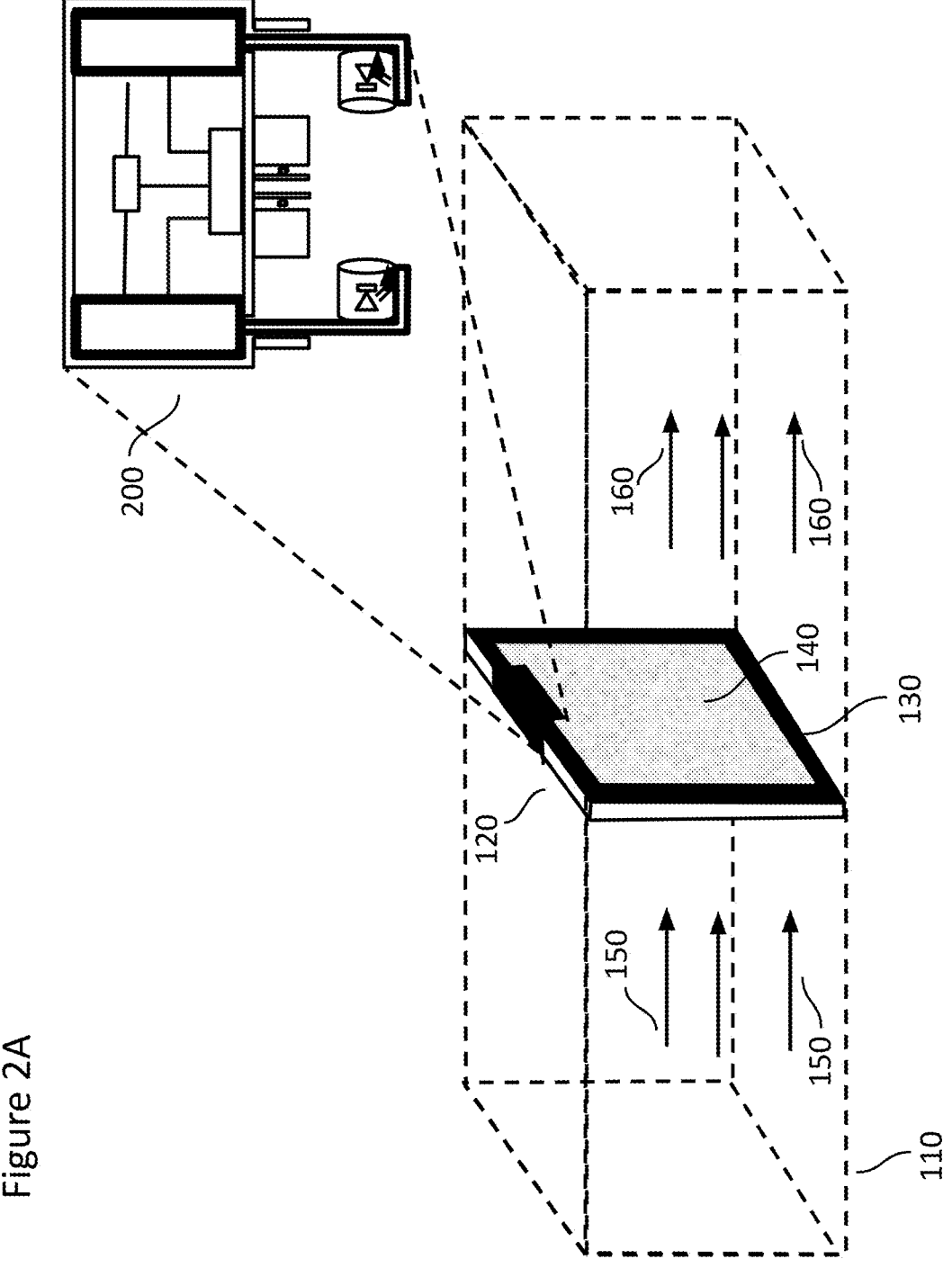
FIG. 2A depicts a schematic diagram in a cross-sectional view of a filter blockage determination and alert communication system.

FIG. 2A depicts a schematic diagram in a vertical cross-sectional view of a filter blockage detection and alert communication system previously disclosed and generally designated as 200. The filter blockage detection and alert communication system 200 is mounted on the filter frame 130 of the filter 120 by means of a clip or a bracket with screws. Alternatively, the system 200 can be mounted on the duct or the frame of the air circulation system (not shown). The structural components of the filter frame 130 or the frame of the air circulation system, the mounting structures, and the mounting hardware are not shown in the diagram.

Figure 2B:
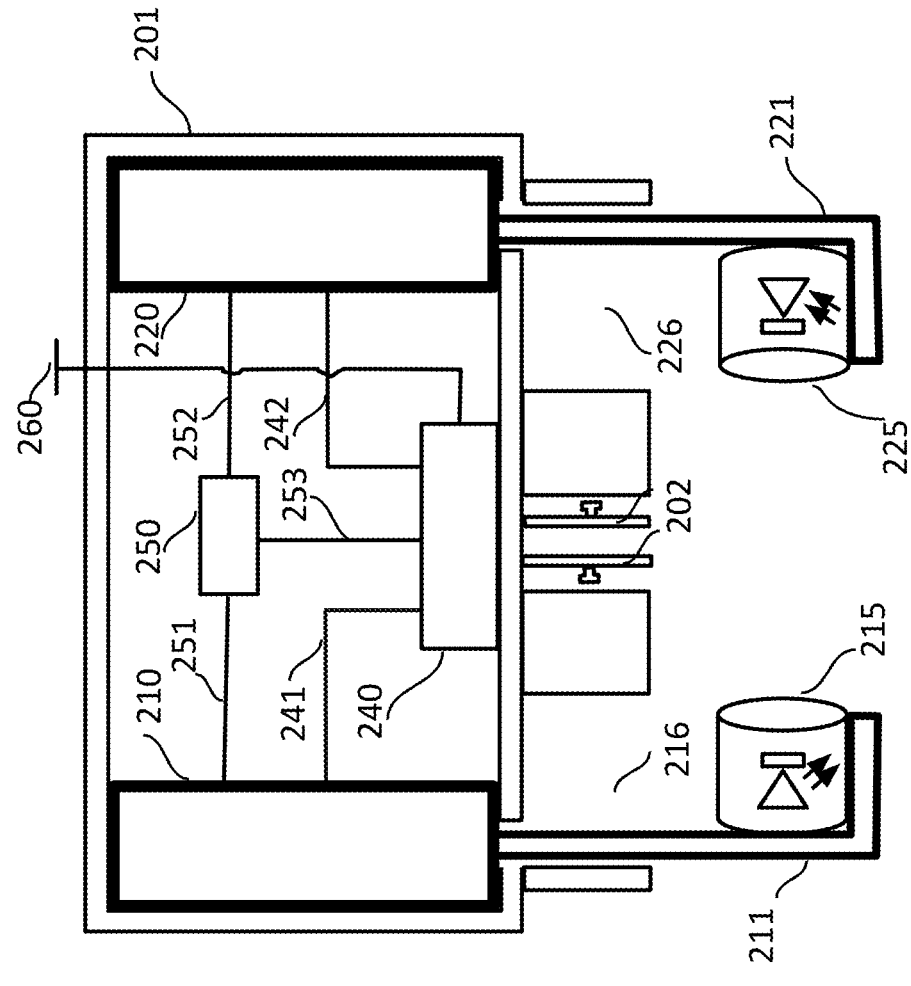
FIG. 2B depicts a schematic diagram in a vertical cross-sectional view of the salient components of the filter blockage detection and alert communication system.

FIG. 2B depicts a schematic diagram in a vertical cross-sectional view of the salient components of the filter blockage detection and alert communication system 200. The system 200 comprises a housing 201, a mounting device 202, two actuators 210 and 220, an energy source device 215, an energy sensor device 225, a control device 240, an electric power source 250, and an antenna 260. The mounting device can be a clip or a bracket for mounting the system 200 onto the frame 130 of the filer 120. Alternatively, the system 200 can be mounted with the mounting device 202 onto a duct or another element of an air circulation system. The control device 240 is coupled with the actuators 210 and 220 via the control links 241 and 242, respectively. The energy source device 215 is attached at the end of the actuator arm 211 of the actuator 210. The energy sensor device 225 is attached at the end of an actuator arm 221 of the actuator 220. The power source 250 is a battery. Alternatively, the power source is a power unit coupled with an external power source such as a vehicle battery, an air circulation system power unit, or a grid power wall socket, from which power is drawn by the power source 250. The power source 250 provides electric power to the actuators 210 and 220 via the wirings 251 and 252, respectively, and to the control device 240 via the wiring 253.

The actuator 210 extends its actuator arm 211 responsive to a first control signal received from the control device 240. When the arm 211 is extended the energy source device 215 attached at the end of the arm 211 is placed at a location on a first side of the filter membrane 140. The actuator 210 retracts its arm 211 responsive to a second control signal received from the control device 240. When the arm 211 is fully retracted the energy source device 215 is pulled into the cavity 216 for storage inside the housing 201. The actuator 220 extends its actuator arm 221 responsive to a third control signal from the control device 240. When the actuator arm 221 is extended the energy sensor device 225 attached at the end of the arm 221 is placed at a location on the second side of the filter membrane 140. The extensions of the actuator arms 211 and 221 are equal so that the energy source device 215 and the energy sensor device 225 are located on the opposite sides of the membrane 140 and directly facing each other in close proximity to but not touching the filter membrane 140. The actuator 220 retracts its arm 221 responsive to a fourth control signal received from the control device 240. When the arm 221 is fully retracted the energy sensor device 225 is pulled into the cavity 226 for storage inside the housing 201.

The actuator 210 or a separate actuator (not shown) can pull in a first screen (not shown) beneath the cavity 216 when the arm 211 is retracted and the energy source device 215 is stored in the cavity 216. The actuator 220 or yet another actuator (not shown) can pull in a second screen (not shown) beneath the cavity 226 when the arm 221 is retracted and the energy sensor device 225 is stored in the cavity 226. The purpose of the screens is to keep the energy source device 215 and the energy sensor device 225 free of dust and other particulates in the air circulation system. Additionally, brushes (not shown) may be installed on the side walls of the cavities 216 and 226 so that when the energy source and sensor devices are pulled into the cavities the front surfaces of the source and sensor devices are automatically cleaned.

The antenna 260 is coupled with the control device 240 and a wireless network. The control device 240 communicates with external devices and systems via the antenna 260 and the wireless network. Antenna 260 can be selected from a variety of well know antenna technologies. For example, the antenna can be a dipole or fractal type and can be laid on the surface of the housing. The antenna is to be selected appropriate for communication with the wireless network technology.

Figure 3:
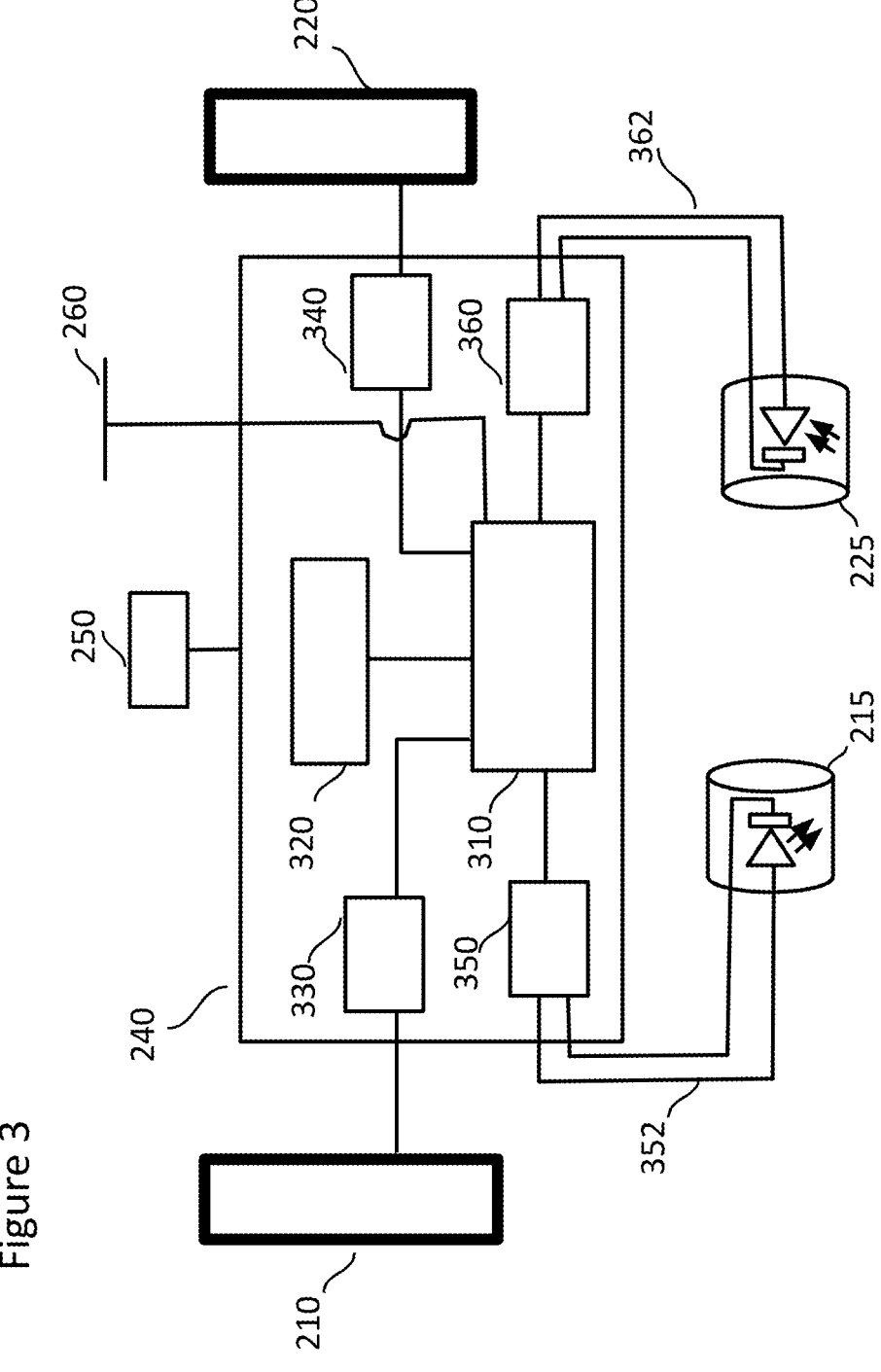
FIG. 3 depicts a schematic diagram of the salient components of a control unit in the filter blockage detection and alert communication system.

FIG. 3 depicts a schematic diagram of the salient components of the control device 240 in the filter blockage detection and alert communication system 200. The control device 240 comprises a central processing unit (CPU) or a microcontroller unit (MCU) 310, a memory unit 320, a first actuator controller 330, a second actuator controller 340, an energy source controller 350, and an energy sensor controller 360. The memory unit 320 is coupled with the processing unit 310 via data lines. The memory unit 320 can also be an integral part of the processing unit 310. A software or a firmware program is stored in the memory unit 320. The processing unit 310 is coupled with the actuator controllers 330 and 340 via control data lines. The processing unit 310 is coupled with the antenna 260 to receive and send wireless communication data. The processing unit 310 is coupled with the energy source controller 350 via control data lines. The processing unit 310 is coupled with the energy sensor controller 360 via control data and measurement data lines.

The software program includes instructions for the processing unit 310 to conduct blockage measurement periodically. The periodicity of the measurements and the time of the measurement can be specified and changed in the program. At the instant of instructed measurement time, the processing unit 310 sends a first control signal to the actuator controller 330 and sends a second control signal to the actuator controller 340. The actuator controllers 330 and 340 in response to receiving the control signals from the processing unit 310 activate the actuators 210 and 220, respectively. Being activated the actuators 210 and 220 extend the arms 211 and 221 to place the energy source device 215 and energy sensor device 225, respectively, on two sides of the filter membrane 140. The actuator controllers 330 and 340 send completion signals to the processing unit 310 when the controllers 330 and 340 have completed the extensions of the actuator arms.

Upon receiving the completion signals from the actuator controllers 330 and 340, the processing unit 310 sends measurement command signals to the energy source device controller 350 and the energy sensor controller 360. The energy source controller 350 is coupled with the energy source device 215 via the power lines 352. The energy source controller 350 upon receiving the measurement command signals commands a power source to power on the energy source device 215. The energy source controller 350 can also adjust the amount of current or power driven into the energy source device 215. The energy source controller 350 can derive power from the power source 250 and supply power to the energy source device 215. Alternatively, the power lines 352 can be coupled with the actuator 210 or the power source 250 directly. In that case, the controller 350 sends a control signal to the actuator 210 or the power source 250 to power on the energy source device 215. The energy sensor controller 360 is coupled with the energy sensor device 225 via the power and data lines 362. The energy sensor controller 360 upon receiving the measurement command signals commands a power source to power on the energy sensor device 225. The energy sensor controller 360 can derive power from the power source 250 and supply power to the energy sensor device 225. Alternatively, the power lines of the power and data lines 362 can be coupled with the actuator 220 or the power source 250 directly. In that case, the controller 360 sends a control signal to the actuator 220 or the power source 250 to power on the energy source device 225. When the energy sensor device 225 is powered on the energy sensor device takes measurement of the intensity of the energy received. It is to be noted that the intensity is specifically defined as the energy received per unit area per unit time. Therefore an intensity measurement is considered in the current context to be equivalent to measurement of energy in a given area such as the area of the energy sensor and for a period of time such as the measurement duration. The energy sensor device 225 sends the measured energy intensity data to the energy sensor controller 360 via the data lines of the power and data lines 362. The energy sensor controller 360 sends the measured data to the processing unit 310. The actions of turning on power to the energy source and sensor devices and taking measurements can also be done automatically when the extensions of the actuation arms are completed without the need for explicit measurement signals.

The processing unit 310 determines when the measurement is completed based on the energy intensity data received from the energy sensor controller 360. Upon the determination of the completion of the measurement, the processing unit 310 sends measurement completion signals to the energy source and sensor controllers 350 and 360. The controllers 350 and 360 then turn off the power to the energy source and sensor devices 220 and 230 and send arm retraction signals to the actuator controllers 330 and 340, respectively. The actuators upon receiving the retraction signals retract the arms to stow away the energy source and sensor devices 215 and 225 in their respective cavities.

The processing unit 310 analyzes the energy intensity data received from the energy sensor controller 360. The processing unit 310 may store the intensity data from multiple measurements. The processing unit 310 uses the data from a single measurement or multiple measurements to determine the degree of blockage of the filter 120. The processing unit 310 can use a simple method of blockage determination by comparing the intensity value from the current measurement with a baseline intensity. The processing unit 310 can use other methods to determine a current average value of the energy intensity. For example, the processing unit 310 can take the average of the intensity from several of the latest measurements and compare the average value with the baseline intensity. In another example, the processing unit can perform statistical analysis of the energy intensity data trend over time. Based on the comparison or the trend analysis, the processing unit 310 determines the degree blockage of the filter 120. When the degree of blockage exceeds a predetermined blockage threshold value stored in the memory 320 the processing unit 310 generates an alert message and communicates the message to an end user device.

The baseline intensity value can be the intensity value measured for the first time after a new filter is installed and the blockage detection and communication system are reset. Alternatively, a known value based on prior measurements on a particular type of filter can be stored in the memory 320. The blockage threshold value is determined by the user and can be based on the user's specific requirements such as health conditions and air quality in the environment. The user can change the threshold value anytime and for any reason. For example, after receiving the alert the user may decide to continue to use the filter as is after a visual inspection of the filter for a period of time. Then the user can send a new threshold value to the processing unit 310 for storage in the memory 320.

Figure 4A:
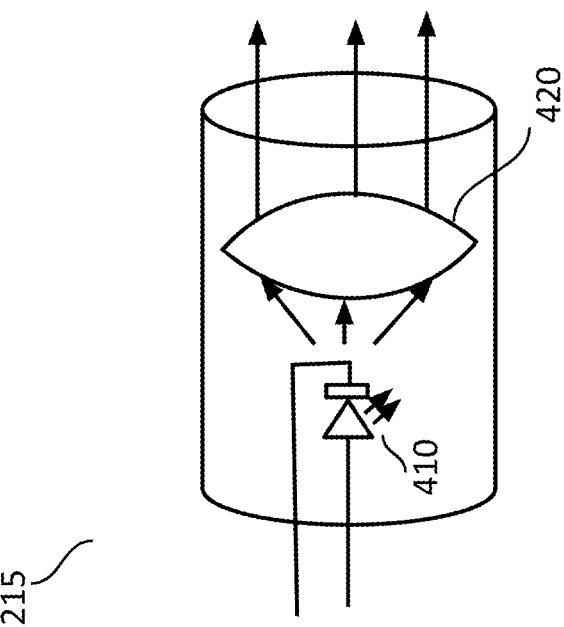
FIG. 4A depicts a schematic diagram of the salient components of a single light source.

FIG. 4A depicts a schematic diagram of the salient components of the energy source device 215. The energy source device 215 comprises a light source device 410 in the form of a light emitting diode (LED) or a laser diode (LD) and a convergent lens 420. The light source device 410 is located at the second focal point of the lens 420. The arrangement allows the light from the device 410 to emerge from the lens 420 as uniform parallel light rays hitting the air filter membrane 140. The uniformization can also be achieved by means of a curved mirror placed on the back side of the light source.

Figure 4B:
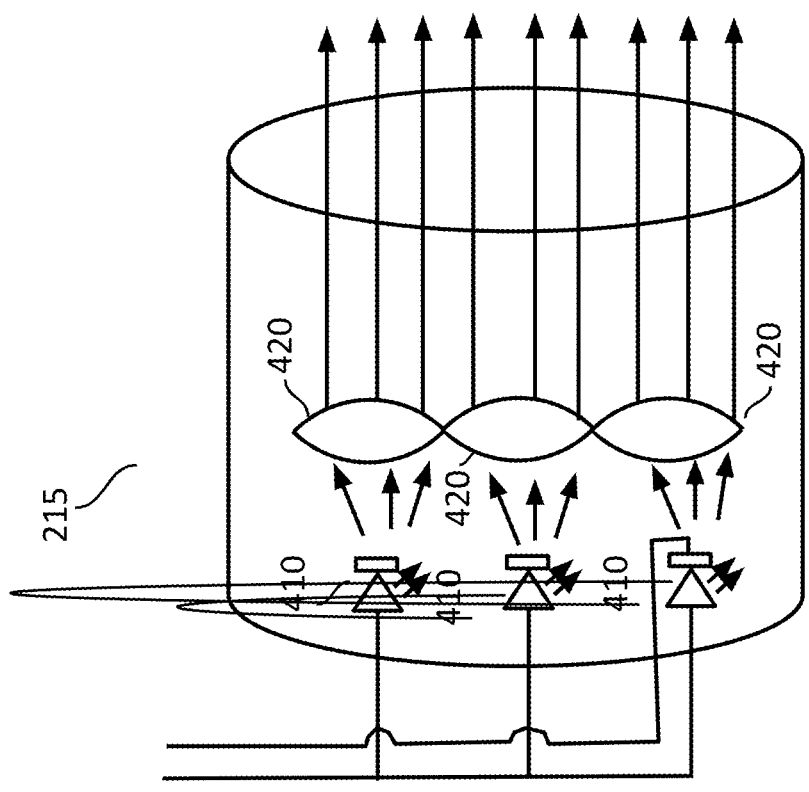
FIG. 4B depicts a schematic diagram of the salient components of multiple identical light sources.

FIG. 4B depicts a schematic diagram of the salient components of the energy source device 215 in a second embodiment. The energy source device 215 comprises a plurality of light source devices 410 in the form of LEDs or LDs and a plurality of convergent lenses 420. Each of the light source devices 410 is located at the second focal point of each of the corresponding lenses 420. The arrangement allows light from the devices 410 to emerge from the lenses 420 as a larger area wide uniform light compared to the first embodiment described earlier.

Figure 5A:
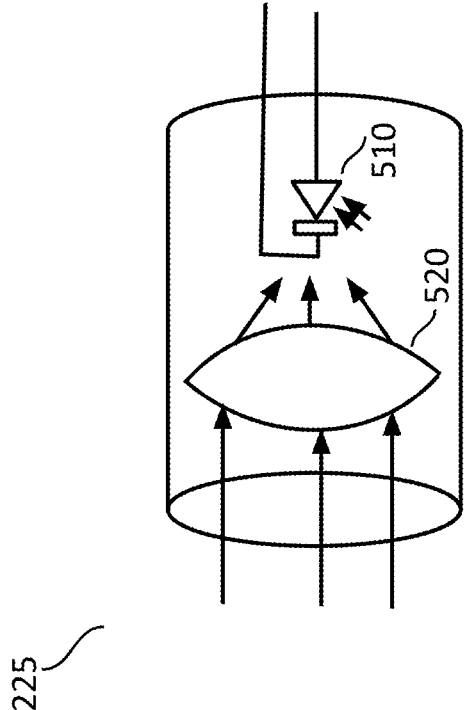
FIG. 5A depicts a schematic diagram of the salient components of a light sensor.

FIG. 5A depicts a schematic diagram of the salient components of the light sensor device 225 in a first embodiment. The energy sensor device 225 comprises a light sensor device 510 and a convergent lens 520. The light sensor device 510 can be selected from a variety of photosensor technologies including PIN photodiode, avalanche photodiode (APD), photoresistor, quantum dot photodiode, charge coupled device (CCD), etc. The light sensor device 510 is located at the first focal point of the lens 520. The arrangement allows the light transmitted through the filter membrane to be focused onto the light sensor device 510. The focusing can also be achieved by means of a curved mirror placed on the back side of the light sensor device 510.

Figure 5B:
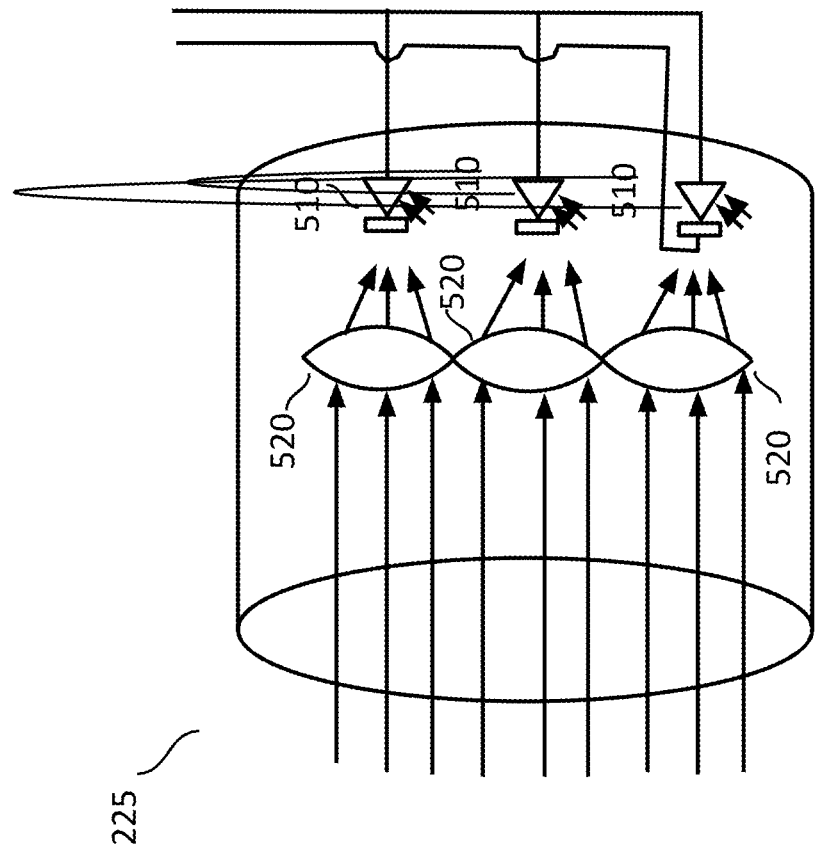
FIG. 5B depicts a schematic diagram of the salient components of multiple identical light sensors in another embodiment.

FIG. 5B depicts a schematic diagram of the salient components of the energy sensor device 225 in a second embodiment. The energy sensor device 225 comprises a plurality of light sensor devices 510 and a plurality of convergent lenses 520. The light sensor devices 510 can be selected from a variety of photosensor technologies including PIN photodiode, avalanche photodiode (APD), photoresistor, quantum dot photodiode, charge coupled device (CCD), etc. The light source devices 510 are located at the first focal points of the corresponding lenses 520. The arrangement allows the light transmitted through a wider area of the filter membrane to be focused onto the light sensor devices 510.

The frequency of the light to be used can be selected either in the visible frequency spectrum or in the infrared frequency spectrum.

Figure 6:
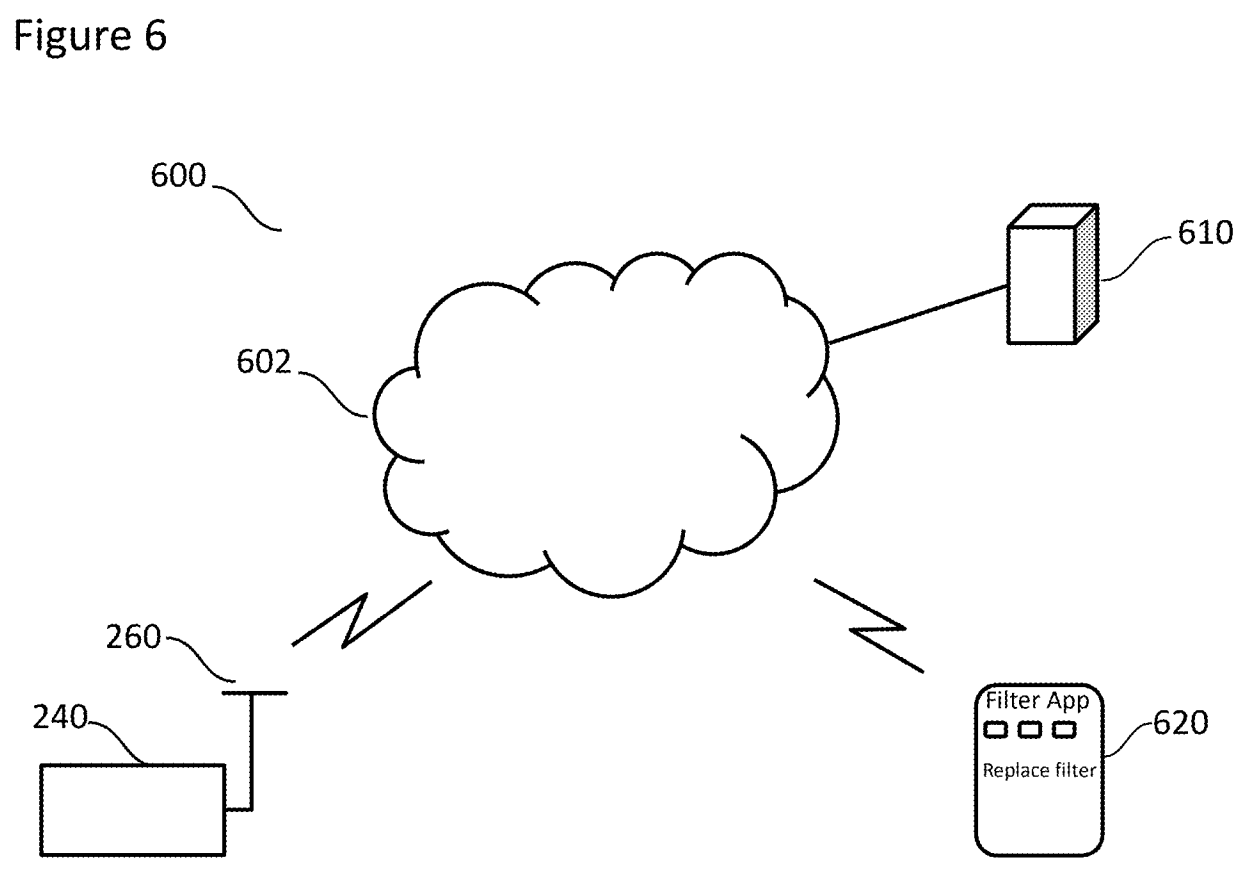

FIG. 6 depicts a schematic diagram of the salient components of a communication system 600. The communication system comprises the control device 240, the antenna 260, a wireless network 602, a server computer 610, and a user device 620. The antenna 260, the server computer 610 and the user device 620 are coupled via the network 602. Typically, the server computer is coupled with the network via wired connection such as fiber optics links. The user device is typically a mobile phone coupled with the wireless network by radio links. The control device 240 is typically coupled with the wireless network via radio link between the antenna 260 and one or more base station antennae in the wireless network 602. The control device 240 can also be coupled with the server computer 610 and the user device 620 via a combination of a WiFi network and a wireless or wireline network.

The system 200 can advantageously use the IoT capabilities of the wireless network 602. The IoT capabilities are based on technology standards defined by International Telecommunication Union (ITU) and 3GPP ($3^{rd}$ Generation Partnership Project—a telecommunications industry consortium). Devices and networks compliant with IoT standards specifications such as 3GPP TR 36.752 and ITU-T Y-2060 have several advantages. For example, the communication protocols and bandwidth requirements are defined specifically for efficient usage by a significantly greater number of IoT devices for shorter bursts of communications compared to the requirements for human to human or human to machine communications. Because standards based devices are used worldwide the components required to implement IoT features in devices are cheaper. The IoT capability provides the necessary infrastructure including communication protocols, security, device and network management, bandwidth specifications, etc. for device to device in other words among things communications. Thus, it is advantageous for the control device 240 to utilize the IoT capabilities for short and bursty communications with the computer server 610 and the user device 620.

The user device 620 includes an application program for communication with the filter alert and communication system 200. When an alert message is received from the system 200 directly or from the server 610, the application program is activated, and an appropriate alert is displayed on the user interface of the application program in the device 620. In addition to receiving alert messages, the user can send a filter status enquiry to the system 200 or to the server 610. In response to the enquiry the system 200 or the server 610 sends the current filter status information for display on the user interface on the screen of the user device 620. Furthermore, the user can send a new blockage threshold value to the system 200 or the server computer 610 and the system stores the new threshold value in the memory. The alert message can also be in the form of a text message to the user device 620.

The filter device 200 set up can be easily accomplished with the application program. For example, the user can download the application program from the blockage detection system manufacturer's website. The application program when opened asks the user to insert the device 200 ID which is typically printed on the device. The application program then automatically communicates with the server to set up the user's account, to register and to activate the system 200.

The energy source and sensor devices 215 and 225 in the embodiments described in reference to FIGS. 4 and 5, the energy source device 215 is a light energy source device and the energy sensor device 225 is a light energy sensor device. In another embodiment, the energy source device 215 is an acoustic energy source device. The acoustic energy source device can be in the form of a microphone. The energy sensor device 225 is an acoustic transducer which converts the received acoustic energy into an electrical signal. The transducer can be a piezoelectric device which converts received acoustic wave pressure into an electrical signal and amplifies the electrical signal.

Figure 7:
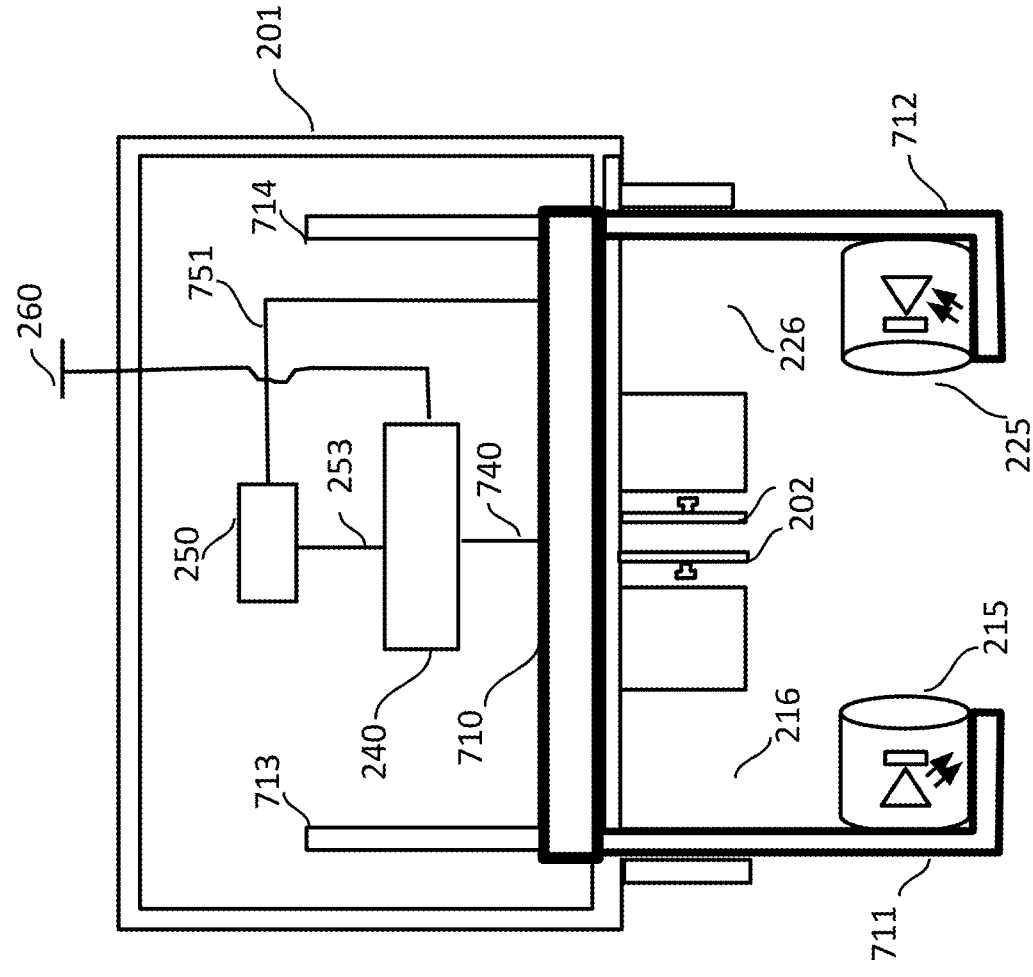
FIG. 7 depicts a schematic diagram in a vertical cross-sectional view of the salient components of the filter blockage detection and alert communication system in a second embodiment.
Figure 7:
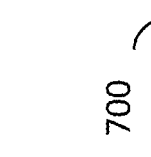

FIG. 7 depicts a schematic diagram in a vertical cross-sectional view of the salient components of a filter blockage detection and alert communication system 700 in another embodiment. In this embodiment the control device 240 is coupled to a single actuator 710 via the control link 740. The actuator 710 includes two arms 711 and 712 at the end of which the energy source device 215 and the energy sensor device 225 are attached, respectively. The power source 250 is coupled with the actuator 710 via a power line 751. The actuator 710 includes extensions 713 and 714 in the body of the actuator for the arms 711 and 712 to be retracted into. The control of the actuator 710 and the rest of the operation of the filter blockage detection and alert communication system 700 are identical to the system 200.

Figure 8:
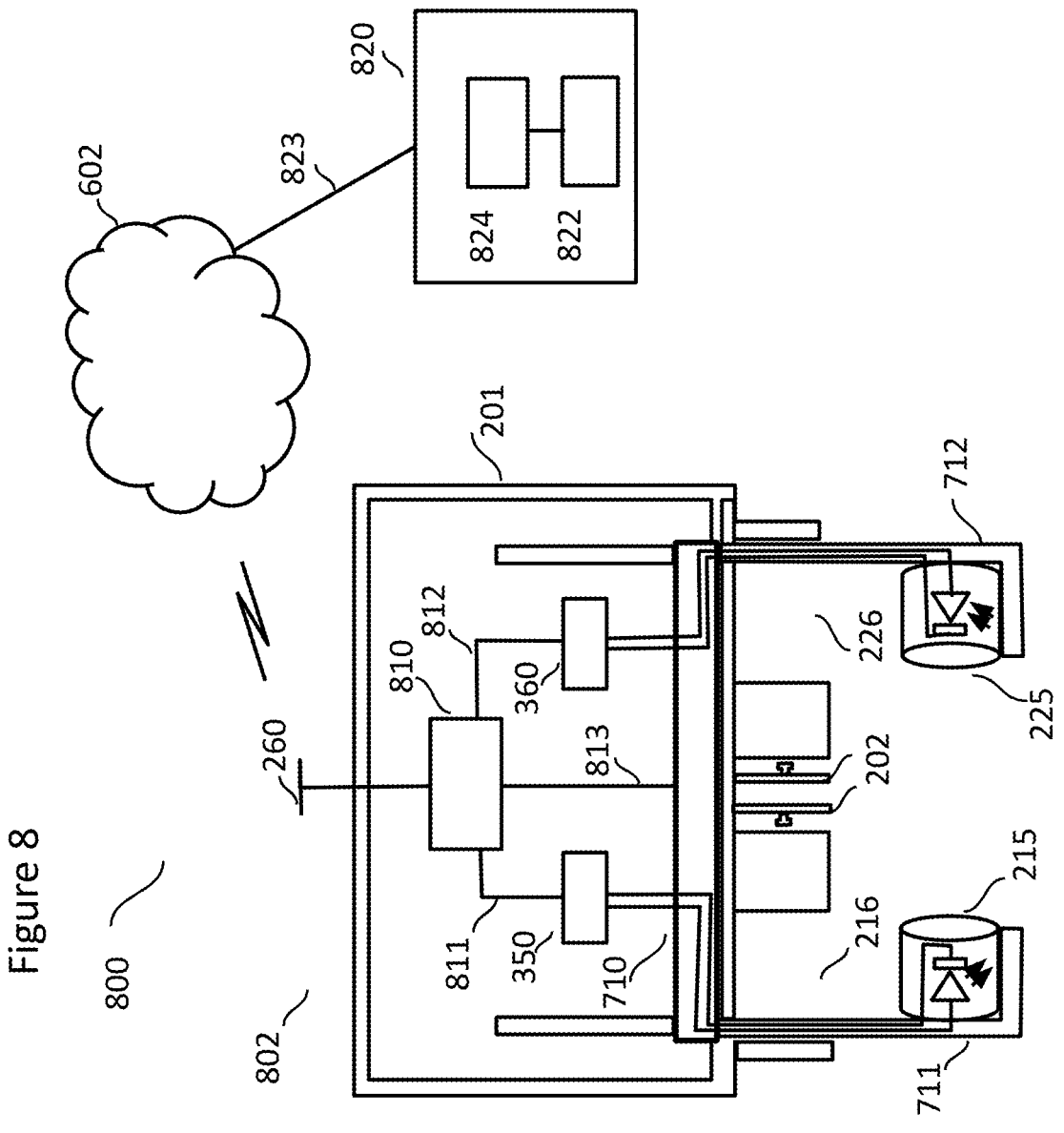
FIG. 8 depicts a schematic diagram in a vertical cross-sectional view of the salient components of the filter blockage detection and alert communication system in a third embodiment.

FIG. 8 depicts a schematic diagram in a vertical cross-sectional view of the salient components of a filter blockage detection and alert communication system 800 in accordance with yet another embodiment. In this embodiment the system 800 comprises an energy measurement device 802 and a server computer 820. The energy measurement device 802 comprises the housing 201, the energy source unit 215, the energy sensor unit 225, the actuator 710, the actuator arms 711 and 712, the bracket 202, the energy source controller 350, the energy sensor controller 360, the antenna 260, and a communication device 810. The actuator 710 can also be replaced by the two actuators 210 and 220 in the embodiment of FIG. 2B. The communication device 810 is coupled with the energy source controller 350 via the control link 811, with the sensor controller 360 via the control link 812, with the actuator 710 via the control link 813 and with the network 602 via the antenna 260. The computer server comprises a CPU 822 and a memory 824. The computer server 820 is coupled with the network 602 via a network link 823.

In the embodiment of FIG. 8, the server computer 820 performs the processing operations for the system 800. A software program is stored in the memory unit 824. The program includes instructions for the CPU 822 to conduct blockage measurement periodically. The periodicity of the measurements and the time of the measurement can be specified and changed in the program. At the instant of instructed measurement time, the CPU 822 sends actuator control signals to the energy measurement unit 802 for the control of the actuator 710. The communication device 810 receives the actuator control signal via the network 602 and converts the control signal into an appropriate format for the actuator controller in the actuator 710. Responsive to the actuator control signal, the actuator 710 places the energy source and sensor device 215 and 225 onto two sides of the filter membrane 140. The actuator controllers send a completion signal to the communication device 810 for communication with the server 820. The communication device 810 formats and sends the formatted completion signal to the server 820 via the network 602. Upon receiving the completion signal, the CPU 822 sends activation signals to the energy source and sensor devices 215 and 216 via the communication device 810. Upon receiving the activation signals, the energy source device 215 and the energy sensor device 225 are powered on. The energy sensor device 225 then measures a quantity of the portion of the energy generated by the energy source device 215, transmitted through the membrane of the filter 120 and received at the energy sensor device 225. The energy sensor control device 360 sends the measured energy data to the communication device 810. The communication device 810 performs necessary format conversion on the measured data and sends the data to the server computer 820. Using the measured energy data, the server computer 820 performs the processing operations as described in reference to earlier embodiments. Based on the data processing and analysis, the server computer 820 generates an alert and sends the alert to the user device.

In another embodiment, with reference to FIG. 2B, the actuator 210 places the energy source device 215 and the energy sensor device 225 on the same side of the air filter 120 responsive to a first control signal received from the control device 240. The device 215 and the device 225 are placed so that both face the filter membrane. The device 215 and the device 225 are activated responsive to the first control signal or a second control signal. Upon activation the energy sensor device 225 measures a parameter of the energy generated by the energy source device 215 and scattered by the filter 120. When the measurement is completed the actuator 210 retracts its arm 211 responsive to a second control signal received from the control device 240. The parameter of the energy is one or both the intensity of received energy and the frequency distribution of the received energy.

In yet another embodiment, with reference to FIG. 2B, the actuator 210 places a camera device (not shown) on one side of the filter responsive to a first control signal. The camera device comprises a camera and a light source. Both the light source and the camera are placed so that they face the filter. The camera device is activated responsive to the first control signal or a second control signal. Upon activation the light source generates light and directs the light towards the filter. The light source can be steady light or flashlight customarily used with cameras. The camera takes a picture and sends the picture data to the control unit 240. When the capturing data for the picture is completed the actuator 210 retracts its arm 211. In this embodiment the condition of the filter such as the degree of blockage is determined by analyzing the picture data. In addition to the determination of the filter status using the picture data, the control unit 240 or the server computer sends the picture data to the mobile device 620 on demand or along with an alert to replace the filter. The picture data is displayed on the mobile device for the user to visually assess the condition of the filter.

Figure 9:
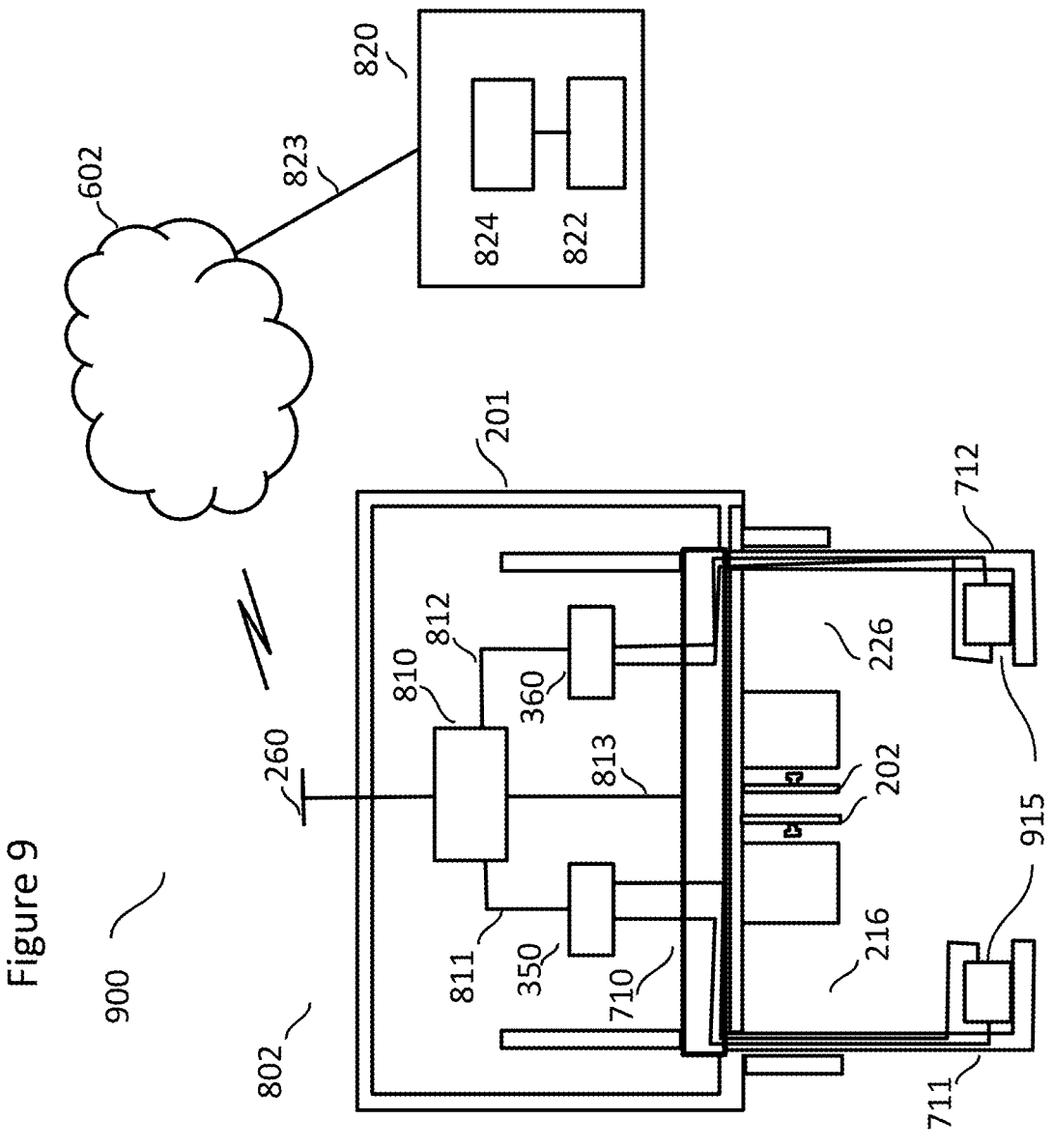
FIG. 9 depicts a schematic diagram in a vertical cross-sectional view of the salient components of the filter blockage detection and alert communication system in a fourth embodiment.

FIG. 9 depicts a schematic diagram in a vertical cross-sectional view of the salient components of a filter blockage detection and alert communication system 900 in accordance with another embodiment. In this embodiment two particulate sensor devices 915 are attached to the two arms of the actuator 210. The actuator 210 places the sensor devices 915 on two sides of the filter responsive to a first control signal. The sensor device 915 is a particulate measurement device that can measure the size and concentration of airborne particles in the micrometer to nanometer ranges. The particulate sensor device 915 can use a variety of well-known and emerging technologies including, optical particulate sensor, CMOS or CCD camera, microelectromechanical systems (MEMS), surface acoustic wave (SAW), bulk acoustic wave (BAW), micro-capacitor, silicon resonant microstructures, Faraday cage electrostatic nanotracer, beta attenuation monitor, continuous aerosol mass monitor, and dusttrack. The paper, Emerging miniaturized technologies for airborne particulate matter pervasive monitoring, Measurement, Elsevier Publication, 101 (2017) 250-256, Carimati et al. describes some of these technologies and methods to measure the size and concentration of airborne particulates.

In the optical particulate sensor-based sensor device 915, the particulate sensor uses light scattered by the particulates to detect the size and density of particulates form the light scattered by the particulates.

In the CCD or CMOS camera-based sensor device 915, particulates deposit directly on the CCD or CMOS surface and a uniform light source included in the device 915 provides a steady background light. The sensor takes a picture on command received periodically from the control unit 810. The device 915 sends the picture data to the server computer 820 which analyzes the data using image processing algorithms to determine the density and size of particulates accumulated over time. The camera surface needs to be cleaned periodically. A micro brush attached to an actuator (not shown) is used to clean the camera surface on command received from the control unit 810. Alternatively, the camera is cleaned when a new filter is installed.

In the MEMS based particulate sensor device 915, the MEMS device in the form of a cantilever, a film bulk acoustic resonator (FBAR), or a surface acoustic wave resonator (SAWR) can be used as a weighing machine for the particulates.

In the capacitance measurement based particulate sensor device 915, when particles enter the space between two microelectrodes the capacitance is increased due to the presence of the particulates. The change in the value of the capacitance is indicative of the density of airborne particulates.

In the silicon resonant microstructure-based sensor device 915, silicon microstructures act as oscillating nanopillars. When particles stick to the pillars the resonant frequency of the pillars change. From the measurement of the frequency change airborne particulate density can be determined.

In the electrostatic detection method, the sensor device 915 charges the particulates using high-voltage diffusion charging method in the first stage. The particulates then are attracted to a grounded Faraday cage generating a current. The current magnitude is indicative of the size of the particulates if the charge of the particulate is proportional to the particulate surface area.

In a variation of the embodiment of FIG. 9, a single particulate sensor device 915 is placed in the air duct or on one of the two sides of the filter. The data received from the sensor device 915 are analyzed and the data trend in terms of size and/or density of particulates in the air over time is used to determine the air quality or the condition of the filter.

The particulate sensor device 915 and the energy sensor device 225 further comprise one or more of a humidity sensor and a mold sensor. When the energy source device 215 is activated the humidity sensor device, the particulate sensor device 915 and the mold sensor device, measures the humidity in the air, the size and density of airborne particulates, and the presence of airborne mold in the air near the device, respectively.

Figure 10:
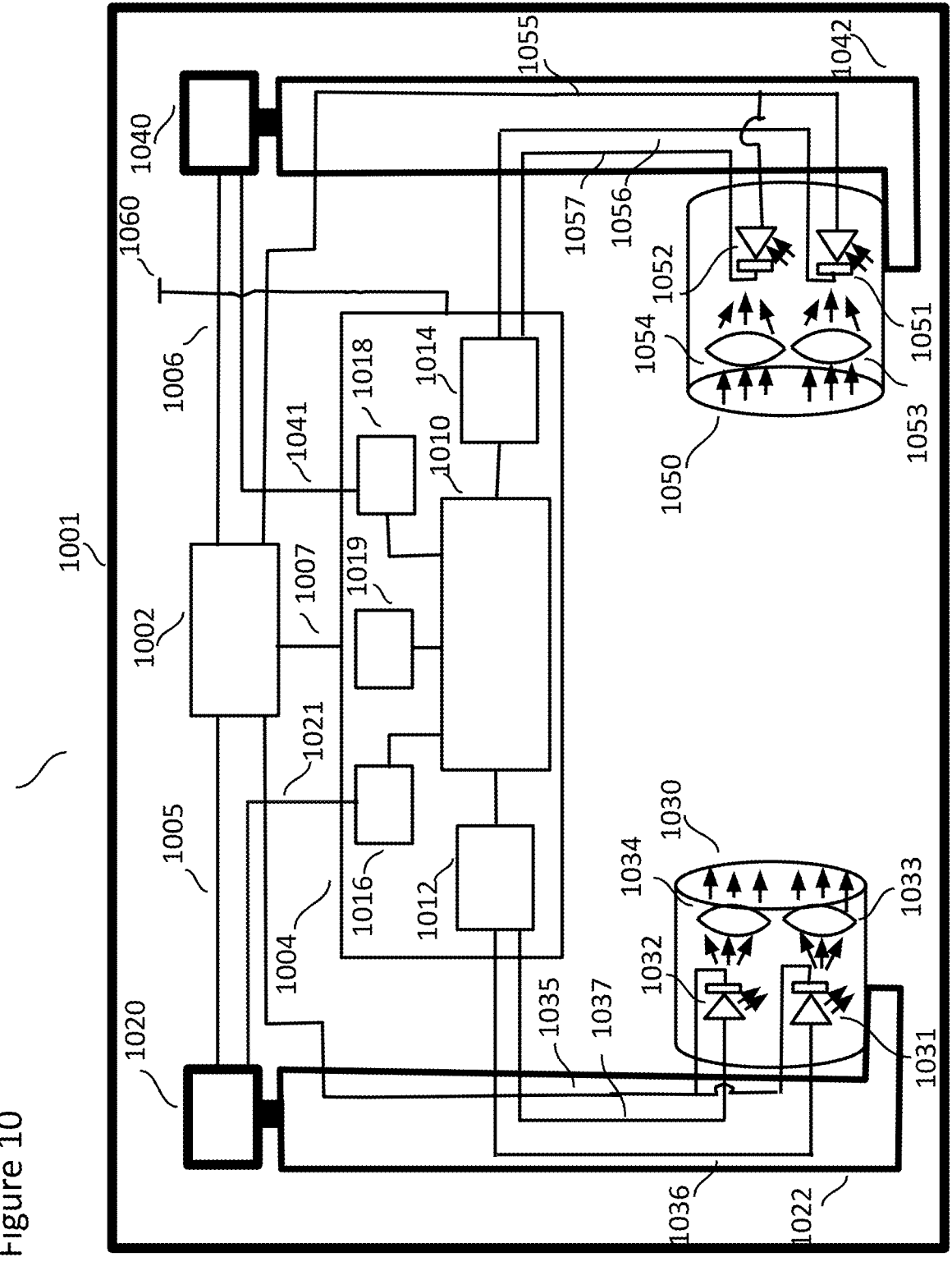
FIG. 10 depicts a schematic diagram of the salient components of a filter blockage detection and alert communication system in accordance with the current invention.

FIG. 10 depicts a schematic diagram of the salient components of the filter blockage detection and alert communication system 1000 in accordance with an embodiment of the current invention. The system 1000 comprises a housing 1001, actuators 1020 and 1040, a light source system 1030, a light sensor system 1050, a control device 1004, an electric power source 1002, actuator arms 1022 and 1042, and an antenna 1060. The control device 240 is coupled with the actuators 1020 and 1040 via the control links 1021 and 1041, respectively. The energy source device 1002 is attached at the end of actuator arm 1022 which is attached to the actuator 1020. The light sensor device 1050 is attached at the end of a second actuator arm 1042 which is attached to the actuator 1040. The power source 1002 is a battery. Alternatively, the power source is a power unit coupled with an external power source such as a vehicle battery, an air circulation system power unit, or a grid power wall socket, from which power is drawn by the power source 1002. The power source 1002 provides electric power to the actuators 1020 and 1040 via the wirings 1005 and 1006, respectively, and to the control device 1004 via the wiring 1007.

The actuator 1020 can be a servo motor. The actuator 1020 moves the actuator arm 1022 responsive to a first control signal received from the control device 1004 via the control link 1021. When the arm 1022 is extended the light source system 1030 attached at the end of the arm 1022 is placed at a location on a first side of the filter membrane 140. The actuator 1020 retracts the arm 1022 responsive to a second control signal received from the control device 1004. When the arm 1022 is fully retracted the energy source system 1030 and the arm 1022 are pulled into an opening of the enclosure 1001. The actuator 1040 extends its actuator arm 1042 responsive to a third control signal from the control device 1004. When the actuator arm 1042 is extended the light sensor system 1050 attached at the end of the arm 1042 is placed at a location on the second side of the filter membrane 140. The control device 1004 controls the actuators 1020 and 1040 such that the source 1030 and the sensor 1050 are simultaneously at the opposite sides of the filter membrane 140. The actuator 1040 retracts the arm 1042 responsive to a fourth control signal received from the control device 1004. When the arm 1042 is fully retracted the energy sensor system 1050 and the arm 1042 are pulled into a second opening of the enclosure.

The antenna 1060 is coupled with the control device 1004 and a wireless network. The control device 1004 communicates with external devices and systems via the antenna 1060 and the wireless network. Antenna 1060 can be selected from a variety of well known antenna technologies. For example, the antenna can be a dipole or fractal type and can be laid on the surface of the housing. The antenna is to be selected appropriate for communication with the wireless network technology.

The control device 1004 comprises a central processing unit (CPU) or a microcontroller unit (MCU) 1010, a memory unit 1019, a first actuator controller 1016, a second actuator controller 1018, a light source controller 1012, and a light sensor controller 1014. The memory unit 1019 is coupled with the processing unit 1010 via data lines. The memory unit 1019 can also be an integral part of the processing unit 1010. A software or a firmware program is stored in the memory unit 1019. The processing unit 1010 is coupled with the actuator controllers 1016 and 1018 via control data lines. The processing unit 1010 is coupled with the energy source controller 1012 via control data lines. The processing unit 1010 is coupled with the energy sensor controller 1014 via control data and measurement data lines.

The light source system 1030 comprises two or more light source devices 1031 and 1032 in the form of light emitting diodes (LEDs) or laser diodes (LDs). The wavelengths selected for the two light source devices are distinct. When a light source such as an LED or LD is characterized as having a specific wavelength it does not mean that the light source generates light of a precisely single wavelength. It means that the intensity of light peaks around the specific wavelength with a trailing off intensity distribution away from the peak wavelength. In this context two distinct wavelengths means that the peak wavelength is distinct for the two light sources with a small or no overlap in the wavelengths of the light generated by the two sources. Light of different wavelengths is attenuated by different amounts by different characteristics of particles deposited on the filter. For example, longer wavelength light is attenuated more by dust particles deposited on a filter compared to shorter wavelength light.

Different wavelength light is attenuated by different amounts depending on the size of the particles deposited on the filter. Thus, measurements of the attenuation for different wavelength light sources provide not only the amount of dust but also some characteristics of the particles including the size and material of the particles.

The system 1030 may further comprise convergent lenses 1033 and 1034 to make the light beams uniform.

The light source system 1030 is coupled with the light source control device 1012 with individual control and power links 1036 and 1037 to provide power and control to the light source devices 1031 and 1032, respectively. The cathode of each of the light sources 1031 and 1032 is connected to the common ground line 1035. The anode of each of the light sources 1031 and 1032 are coupled with the light source controller 1012 by the power and control links 1036 and 1037, respectively. The light source control device 1012 controls the light source devices 1031 and 1032 independently via the control and power links 1036 and 1037, respectively. The light source system 1030 is coupled with the power source device 1002 with grounding link 1035 to provide a common grounding connection for the light source devices 1031 and 1032.

The light sensor system 1050 comprises two or more light sensor devices 1051 and 1052 in the form of a photosensor selected from technologies including PIN photodiode, avalanche photodiode (APD), photoresistor, quantum dot photodiode, charge coupled device (CCD), CMOS photodiode, etc. The peak responsive wavelengths of the light sensors are selected to match the wavelengths of the light sensor devices 1031 and 1032. The system 1030 may further comprise convergent lenses 1053 and 1054 to focus the light onto the sensor devices 1051 and 1052.

The light sensor system 1050 is coupled with the light sensor control device 1014 with individual control and power links 1056 and 1057 to provide power and control to the sensor devices 1051 and 1052, respectively. The light sensor control device 1014 controls the light sensor devices 1051 and 1052 independently via the control and power links 1056 and 1057, respectively. The light source system 1050 is coupled with the power source device 1002 with grounding link 1055 to provide common grounding connection for the light sensor devices 1051 and 1052.

The software program includes instructions for the processing unit 1010 to conduct blockage measurement periodically. The periodicity of the measurements and the time of the measurement can be specified and changed in the program. At the instant of instructed measurement time, the processing unit 1010 sends a first control signal to the actuator controller 1016 and sends a second control signal to the actuator controller 1018. The actuator controllers 1016 and 1018 in response to receiving the control signals from the processing unit 1010 activate the actuators 1020 and 1040, respectively. Being activated, the actuators 1020 and 1040 extend or rotate the arms 1022 and 1042 to place the energy source device 1030 and the sensor device 1050, respectively, on two sides of the filter membrane 140. The actuator controllers 1016 and 1018 send completion signals to the processing unit 1010 when the actuators 1020 and 1030 have completed the extensions of the actuator arms.

Upon receiving the completion signals from the actuator controllers 1016 and 1018, the processing unit 1010 sends a first measurement command signal to the light source device controller 1012 and the light sensor controller 1014 to activate the source device 1031 and the sensor device 1051 for measurement of transmitted light from the source to the sensor. The light source controller 1012 upon receiving the measurement command signal selects the first light source device 1031 and sends power and control signals to the source device 1031 via the link 1036. The light sensor controller 1014 upon receiving the measurement command signal measures the light energy generated by the light sensor device 1051 which has its peak sensitivity at the same wavelength as the source device 1031. The energy sensor device 1051 sends the measured energy intensity data to the energy sensor controller 1014 via the control and power link 1056.

When the processing unit 1010 determines the measurement by the first set of source and sensor 1031 and 1051, respectively, is completed, the processing unit 1010 sends a second measurement command signal to the light source device controller 1012 and the light sensor controller 1014 to activate the source device 1032 and the sensor device 1052 for measurement of transmitted light from the source to the sensor. The processing unit collects light intensity data as described earlier for the second source and the second sensor, 1032 and 1052, respectively. The processing unit 1010 sequentially activates and collects data from all matched pairs of the sources and the sensors.

When the light intensity measurements for all the wavelengths are completed, the processing unit 1010 sends completion signals to the energy source and sensor controllers 1012 and 1014, respectively. The controllers 1012 and 1014 then turn off the power to the energy source and sensor devices 1030 and 1050, respectively.

The processing unit 1010 commands the actuator controllers to place the source and the sensor device at another location of the filter and repeat the measurements described earlier for the new position. When data acquisition for all the positions is completed, the processing unit 1010 sends arm retraction signals to the actuator controllers 1016 and 1018. The actuators 1020 and 1040 upon receiving the retraction signals retract the arms 1022 and 1042, respectively, to stow away the light source and sensor systems and the arms in their respective openings in the enclosure.

The processing unit 1010 analyzes the light intensity data received from the energy sensor controller 1014. The processing unit 1014 may store the intensity data from multiple measurements. The processing unit 1010 uses the data from a single measurement or multiple measurements to determine the degree of blockage of the filter 120. The processing unit 1010 uses the data for different wavelengths to characterize the amounts as well as characteristics of the dust accumulated on the filter. The dust characteristics may include the sizes and material composition of the dust. The processing unit 1010 can use a simple method of blockage determination by comparing the intensity value from the current measurement with a baseline intensity. The processing unit 1010 can use other methods to determine a current average value of the energy intensity. For example, the processing unit 1010 can take the average of the intensity from several of the latest measurements and compare the average value with the baseline intensity. In another example, the processing unit 1010 can perform statistical analysis of the energy intensity data trend over time for each of the wavelengths. Based on the comparison or the trend analysis, the processing unit 1010 determines the degree blockage of the filter 120. When the degree of blockage exceeds a predetermined blockage threshold value stored in the memory 1019, the processing unit 1010 generates an alert message and communicates the message to an end user device. Alternatively, the processing is done in a cloud computer with the data sent by the processor unit 1010 to the cloud computer.

In another embodiment of the filter blockage detection and alert communication system 1000, the light sources 1031, and 1032 are coupled with the source controller 1012 via a selector device (not shown) placed in proximity to the light source devices 1031 and 1032. The selector couples the source controller 1012 by a single connection, e.g., via a single or a pair of wires. The selector then couples the light source devices 1031 and 1032 individually. The source controller 1012 sends control signals each addressed to a specific light source device. The selector uses the address and the control function information in the control signal to control the specifically addressed light source device. The control functions include turn-on and turn-off light source functions. In this embodiment, the number of coupling wires required from the source controller 1012 to the light source system 1030 are reduced.

In yet another embodiment of the filter blockage detection and alert communication system 1000, the light source system 1030 comprises a single light source device in the form of a wavelength adjustable light emitting diode (LED) or a wavelength adjustable laser diode (LD). The wavelength of an LED or LD can be adjusted by adjusting the temperature of the device by using, for example, a Peltier device. Alternatively, a single LED or an LD with multiple intensity peaks at different wavelengths is used with a selectable filter to select only one wavelength peak from the multiple peaks. In this embodiment, the source control device 1012 sends a control signal to the single light source device not only to turn it on but also to generate light of a specific wavelength selected from the wavelengths the light source device is capable of generating. The control signal may include parameters of other components of the source system used for selecting the specific wavelength, for example, the temperature of a Peltier device, the optical filter to be applied for selecting the specific wavelength.

In yet another embodiment of the filter blockage detection and alert communication system 1000, the light sensor devices 1051 and 1052 are coupled with light sensor controller 1014 via a selector device (not shown) placed in proximity to the light sensor devices 1051 and 1052. The selector device couples the sensor controller 1014 with a single connection, e.g, via a single wire or a pair of wires. The selector device then couples the light sensors individually. The sensor controller 1014 sends control signals each addressed to a specific light sensor. The selector device uses the address and the control function information in the control signal to control the specifically addressed sensor to measure transmitted light. In this embodiment the number of coupling wires required from the sensor controller 1014 to the light sensor devices are reduced.

In yet another embodiment of the filter blockage detection and alert communication system 1000, a single sensor device is used in which the sensor device can detect transmitted light of all the wavelengths generated by the light source devices. A broad dynamic range of the wavelength detection photodiode is an example of such a sensor device.

In yet another embodiment of the filter blockage detection and alert communication system 1000 and 1100, the system further comprises an external computer system such as 820 shown in FIG. 8. The computer system computes a lifespan value for a filter based on the filter blockage data collected by a filter blockage detection and alert communication system 1000 or 1100 and generates a statistical life span value based on a plurality of lifespan values calculated over a period of time. The statistical lifespan data for a plurality of filters in a facility or a localized area are used by the computer system to generate a report of the statistical lifespan of the filters. The report is presented in the form of a heat map to a user. The heat map allows the user to visualize the accumulation of dust across the facility or the localized area based on the statistical filter lifespan.

Figure 11:
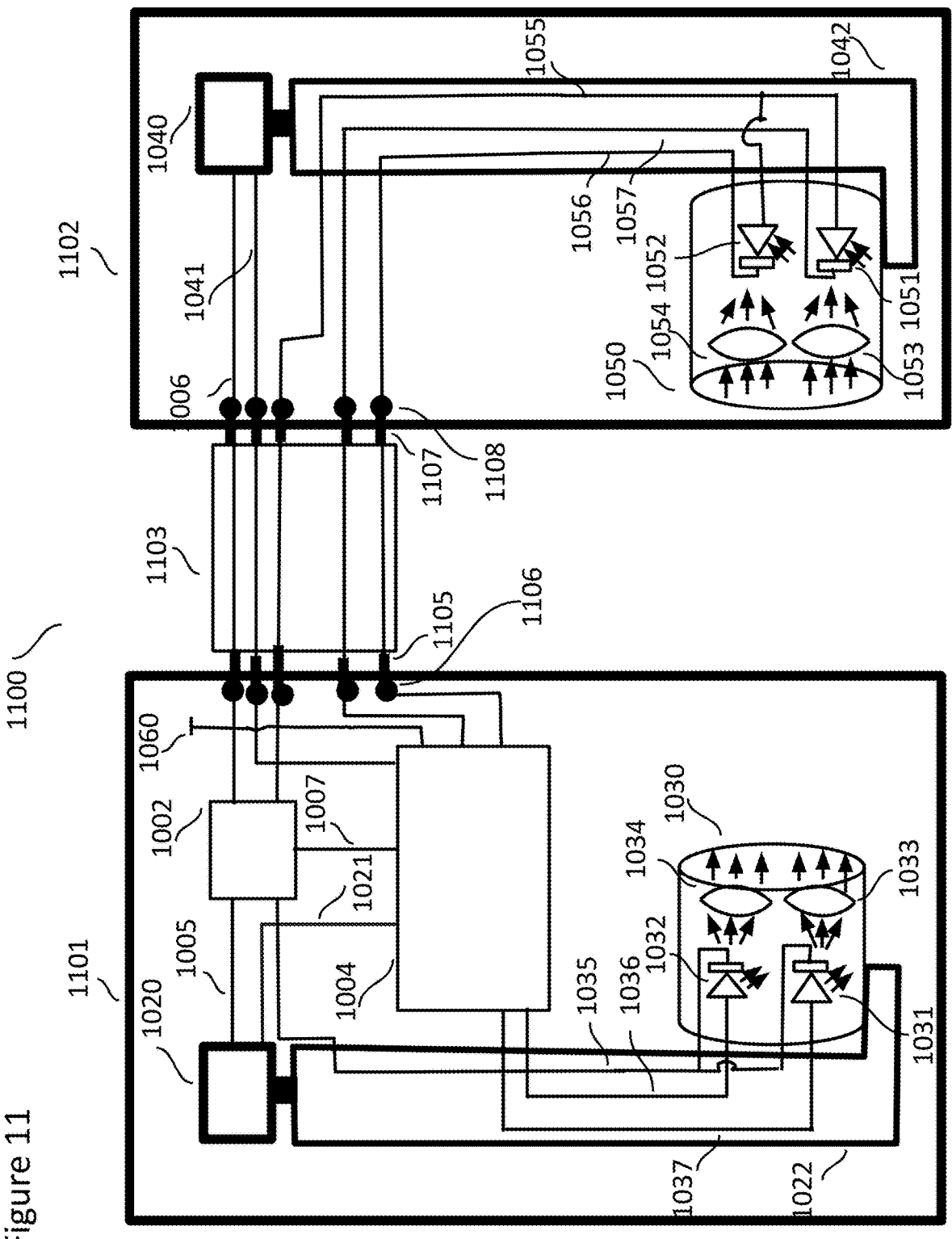
FIG. 11 depicts a schematic diagram of the salient components of the filter blockage detection and alert communication system in accordance with another embodiment of the current invention.

FIG. 11 depicts a schematic diagram of a filter blockage detection and alert communication system 1100 in accordance with another embodiment of the current invention. The system 1100 comprises a first enclosure 1101, a second enclosure 1102, a cable connection unit 1103, the actuators 1020 and 1040, the actuator arms 1022 and 1042, the light source system 1030, the light sensor system 1050, the control device 1004, the electric power source 1002, and the antenna 1060. The control device 1004, the power source 1002, the actuator 1020, the arm 1022 and the light source system 1030 are placed in the enclosure 1101. The actuator 1040, the arm 1042 and the light sensor system 1050 are placed in the enclosure 1102.

The enclosure 1101 has an opening for the arm 1022 and the light source system 1030 attached to the arm 1022 to be moved out of the enclosure 1101 by the actuator 1020 when light measurements at different points near the filter are to be made. The actuator 1020 moves the arm 1022 and the light source system 1030 into the enclosure 1101 when a set of measurements is completed. The opening or the slit for the arm and the light source system can be conveniently made either on the top side of the enclosure or at the bottom side of the enclosure 1101. For example, if the enclosure is installed at the bottom of a duct system, it is convenient to place the arm 1022 and the light source system 1030 at the upper side of the enclosure 1101. The slit or the opening is consequently at the upper side of the enclosure 1101.

The enclosure 1101 further comprises a connector 1106 (only one connector is labeled). In this example, the connectors are of female type.

The enclosure 1102 has an opening or a slit for the arm 1042 and the light sensor system 1030 attached to the arm 1042 to be moved out of the enclosure 1102 by the actuator 1040 when light measurements at different points near the filter are to be made. The actuator 1040 moves the arm 1042 and the light sensor system 1050 into the enclosure 1102 when a set of measurements is completed. The opening or the slit for the arm and the light source system can be conveniently made either on the top side of the enclosure or at the bottom side of the enclosure 1101. For example, if the enclosure is installed at the bottom of a duct system, it is convenient to place the arm 1042 and the light sensor system 1050 at the upper side of the enclosure 1102. The slit or the opening is consequently at the upper side of the enclosure 1102.

The enclosure 1102 further comprises connectors 1108 (only one connector is labeled). In this example, the connectors are of female type.

The cable connection unit 1103 comprises connecting wires and connectors at each of the two ends of each of the connecting wires. The connecting wires can be embedded into a ribbon or a sleeve. The ribbon can be of flexible width so that the system 1100 can be installed in a HVAC system with varying filter width. The ribbon can be of length covering the entire length of the enclosures 1101 and 1102 so that the ribbon does not leave any air gap at the ends of the ribbon. The connectors in this example are of male type.

When the connection unit 1103 is snapped onto the enclosure 1101 and the enclosure 1103 via the female connectors, 1106 and 1108, respectively, the connector wires connect the power, control and data links as shown in FIG. 11. The power and control links 1006 and 1041 are coupled with the power source 1002 and the control device 1004, respectively; the sensor grounding link 1055 is coupled with the power source 1002; and the control and power links 1056 and 1057 are coupled with the control unit 1004.

In another embodiment of the system 1100, the control device 1004, the power source 1002, the actuator 1040, the arm 1042 and the light sensor system 1050 are placed in the enclosure 1101. The actuator 1020, the arm 1022 and the light source system 1030 are placed in the enclosure 1102.

Certain features are of utility and may be employed in the filter blockage detection and alert communication system of the invention. For example, the blockage alert and communication system can include a GPS chip. Based on the GPS data and the blockage data from a large number of filters in a particular area the server can determine the degree of blockage dependent on the air quality in the region. Based on the statistical data analysis of a number of filter blockage devices, the server 610 can develop filter replacement guidelines specifically for the geographical region. A manufacturer such as a car manufacturer can specify filter replacement guidelines customized for each geographical region. The server can send a service alert signal to a service provider such as a car service center when the vehicle of the customer needs to be serviced for filter replacement. Based on the notification the car service center can schedule an appointment with its customer. In another example, the actuators can be both linear and rotational so that the energy source and sensor devices can be placed at different locations to take blockage measurements at different locations of the filter membrane.

In another example, instances of filter data belonging to a single building or a single customer are sent to the computer or server belonging to the customer. Each filter device can be identified with an identifier. The unique identifier for each device may be created using the GPS location, customer identification, equipment identification, etc. The filter data may include conditions of the filter including alert, raw sensor data and pictures. The customer's computer can then process the data further and display the filters and the filter status on a dashboard.

In yet another example, the filter device may include an airflow sensor. The filter device can measure the air quality and/or the filter degradation when the air flow is on or the flow on based on the airflow detection.

In yet another example, when the alert is displayed in the user's device the user interface can provide a button for the user to push to order new filters. When the customer pushes the button a purchase order goes out into the cloud to a home delivery company or the device manufacturing company. Data for the type and size of the user's HVAC filter can be stored in the cloud or in the user device application program.

In yet another example, the filter monitoring system can include other air quality sensing sub-systems such as temperature, humidity, inorganic particulates size and/or density, carbon monoxide; organic particulates size and/or density including mold, virus, bacteria, volatile organic compounds (VOC), etc. The alert and air quality information can be determined and communicated to a user based on one or more of these air quality parameters and the air filter parameters.

In yet another example, the actuator arms in the various embodiments presented earlier may open a door in the housing to expose the sensor devices to air in proximity to the device for sensing the air quality instead of or in addition to extending an actuator arm to place a sensing device on a side of the filter.

In yet another example, the actuator arms of the filter device place two pressure sensing devices in the two opposite sides of a filter and the filter device generates an alert signal based on the pressure data taken by the two pressure sensing devices. It is to be noted that in some embodiments the device of invention is called a filter device and in others it is called air monitoring device. No distinction is to be inferred between the designations of the device of the invention. An air filter device is also an air monitoring device even if it detects only the condition of a filter because the filter condition relates to air quality.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative and are not necessarily drawn to scale. Reference throughout the specification to "first embodiment" or "second embodiment" or "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "first embodiment," "second embodiment," "third embodiment," "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

The invention claimed is:

1. A filter apparatus for use with a filter comprising: a control device, an actuator system, a light source system, and a light sensor system;

wherein the filter apparatus is mounted on a frame of the filter or on a location of a duct of an HVAC system where the filter is installed;

wherein the light source system is capable of generating light of two or more distinct wavelengths;

wherein the light sensor system is capable of measuring the intensity of light of the two or more distinct wavelengths;

wherein the actuator system places the light source system at a first location in close proximity to a first side of a membrane of the filter responsive to one or more actuation control signals received from the control device;

wherein the actuator system places the light sensor system at a second location in close proximity to a second side opposite to the first side of the membrane and facing the light source system responsive to the one or more actuation control signals;

wherein the light source system generates light of a first wavelength selected from the two or more distinct wavelengths responsive to one or more light source system activation signals received from the control device;

wherein the light sensor system measures a first value of the intensity of a portion of light of the first wavelength generated by the light source system and transmitted through the filter responsive to one or more light sensor system activation signals;

wherein the light source system generates light of a second wavelength selected from the two or more distinct wavelengths responsive to the one or more light source system activation signals;

wherein the light sensor system measures a second value of the intensity of a portion of light of the second wavelength generated by the light source system and transmitted through the filter responsive to the one or more light sensor system activation signals;

wherein the actuator system places the light source system at a third location in close proximity to the first side of the membrane responsive to the one or more actuation control signals;

wherein the actuator system places the light sensor system at a fourth location in close proximity to the second side and facing the light source system in the third location responsive to the one or more actuation control signals;

wherein the light source system in the third location generates light of the first wavelength responsive to the one or more light source system activation signals;

wherein the light sensor system in the fourth location measures a third value of the intensity of a portion of light of the first wavelength generated by the light source system in the third location and transmitted through the filter responsive to the one or more light sensor system activation signal;

wherein the light source system in the third location generates light of the second wavelength responsive to the one or more light source system activation signals;

wherein the light sensor system in the fourth location measures a fourth value of the intensity of a portion of light of the second wavelength generated by the light source system in the third location and transmitted through the filter responsive to the one or more light sensor system activation signals;

wherein the control device generates the value of a first particle size efficiency parameter based on the first value and the third value;

wherein the control device generates the value of a second particle size efficiency parameter based on the second value and the fourth value; and wherein the control device generates a filter status alert based on the value of the first particle size efficiency parameter and the value of the second particle size efficiency parameter.

2. The apparatus of claim 1 wherein the filter apparatus further comprising one or more antennae;

wherein the control device generates the alert signal based on the comparison of the value of the first particle size effeciency parameter and the value of the second particle size effeciency parameter with a predetermined threshold value of the first particle size efficiency parameter and a predetermined threshold value of the second particle size efficiency parameter, respectively; and wherein the control device communicates the alert signal to a user device or to a server computer via the one or more antennae.

3. The apparatus of claim 1 wherein the control device comprises a processing unit, a light source controller, a light sensor controller, an actuator controller, and a memory unit;

wherein the control device generates and sends the one or more actuation control signals to the actuator controller responsive to a computer program stored in the memory unit and run in the processing unit;

wherein the actuator controller actuates the actuator system responsive to the one or more actuation control signals; and wherein the control device generates and sends the one or more light source system activation signals to the light source controller responsive to the computer program run in the processing unit; and wherein the control device generates and sends the one or more light sensor system activation signals to the light sensor controller responsive to the computer program run in the processing unit.

4. The apparatus of claim 1 wherein the light source system comprises two or more light source devices;

wherein each of the two or more light source devices generates light of wavelength distinct from the wavelengths of all the other light source devices responsive to the one or more light source system activation signals.

5. The apparatus of claim 4 wherein the light source system further comprises a selector;

wherein the selector selects a light source device from the two or more light source devices and couples the selected light source device with the control device responsive to the one or more light source system activation signals received from the control device.

6. The apparatus of claim 4 wherein the light source devices are one of light emitting diodes and laser diodes.

7. The apparatus of claim 1 wherein the light source system comprises a light source device capable of generating light of two or more wavelengths and a wavelength selection device for selecting one of the two or more wavelengths;

wherein the light source device generates light of the two or more distinct wavelengths responsive to the one or more light source system activation signals; and wherein the wavelength selection device selects one of the two or more wavelengths responsive to the one or more light source system activation signals.

8. The apparatus of claim 7 wherein the wavelength selection device is one of a heating device and an optical filter selection device;

wherein the one or more light source system activation signals further comprise one or more of the temperature of the heating device and an identification of an optical filter in the filter selection device to select the one of the two or more wavelengths.

9. The apparatus of claim 7 wherein the light source device is one of a light emitting diode and a laser diode.

10. The apparatus of claim 1 wherein the light sensor system comprises two or more photodetectors wherein each of the two or more photodetectors measures intensity of light of a specific wavelength selected from the two or more distinct wavelengths independently responsive to the one or more light sensor system activation signals.

11. The apparatus of claim 10 wherein the photodetectors are one of PIN photodiodes, avalanche photodiodes, photoresistors, quantum dot photodiodes, charge coupled devices, and CMOS photodiodes.

12. The apparatus of claim 1 wherein the light sensor system comprises a photodetector;

wherein the photodetector measures intensity of light of each of the two or more distinct wavelengths responsive to the one or more light sensor system activation signals; and wherein the photodetector is one of a PIN photodiode, an avalanche photodiode, a photoresistor, a quantum dot photodiode, a charge coupled device, and a CMOS photodiode.

13. The apparatus of claim 1 wherein the actuator system places the light source system at a fifth location substantially away from the first side of the membrane of the filter and places the light sensor system at a sixth location substantially away from the second side of the membrane of the filter responsive to the one or more actuation control signals received from the control device upon completion of the measurements.

14. The apparatus of claim 1 wherein the actuator system comprising an actuator, a first actuator arm, and a second actuator arm;

wherein the light source system is attached to the first actuator arm;

wherein the light sensor system is attached to the second actuator arm;

wherein the actuator moves the first actuator arm to place the light source system at the first location; and wherein the actuator moves the second actuator arm to place the light sensor system at the second location.

15. The apparatus of claim 1 wherein the actuator system comprising a first actuator, a first actuator arm, a second actuator, and a second actuator arm;

wherein the light source system is attached to the first actuator arm;

wherein the light sensor system is attached to the second actuator arm;

wherein the first actuator moves the first actuator arm to place the light source system at the first location; and wherein the second actuator moves the second actuator arm to place the light sensor system at the second location.

16. A filter apparatus for use with a filter comprising: a power supply device, a control device, a first actuator, a second actuator, a first actuator arm, a second actuator arm, a light source system, a light sensor system, a first enclosure, a second enclosure, and a connection device;

wherein the power supply device supplies power to the control device, the first actuator, the second actuator, the light source system, and the light sensor system;

wherein the power supply device, the control device, the first actuator, the first actuator arm, and one of the light source system and the light sensor system are enclosed in the first enclosure;

wherein the second actuator, the second actuator arm, and the other of the light source system and the light sensor system are enclosed in the second enclosure;

wherein the connection device couples the power supply device, the control device, the first actuator, and the one of the light source system and the light sensor system of the apparatus enclosed in the first enclosure with the second actuator and the other of the light source system and the light sensor system enclosed in the second enclosure;

wherein the first actuator arm is coupled with the first actuator and the light source system;

wherein the second actuator arm is coupled with the second actuator and the light sensor system;

wherein the first actuator actuates the first actuator arm to place the light source system at a first location in close proximity to one side of a membrane of the filter responsive to one or more actuation control signals received from the control device;

wherein the second actuator actuates the second actuator arm to place the light sensor system at a second location in close proximity to the opposite side of the membrane and facing the light source system responsive to the one or more actuation control signals received from the control device;

wherein the light source system generates light responsive to one or more light source system activation signals received from the control device; and wherein the light sensor system measures in a first measurement the intensity of light generated by the light source system and transmitted through the filter responsive to one or more light sensor system activation signals.

17. The apparatus of claim 16 wherein the first actuator actuates the first actuator arm to place the light source system at a third location in close proximity to the one side of the membrane responsive to the one or more actuation control signals;

wherein the second actuator actuates the second actuator arm to place the light sensor system at a fourth location in close proximity to the other side of the membrane and facing the light source system responsive to the one or more actuation control signals;

wherein the light source system generates light responsive to the one or more light source system activation signals;

wherein the light sensor system measures in a second measurement the intensity of a portion of light generated by the light source system and transmitted through the filter responsive to the one or more light sensor system activation signals; and wherein the control device receives the light intensity values from the first and the second measurements.

18. The apparatus of claim 17 wherein the filter apparatus further comprising one or more antennae;

wherein the one or more antennae are enclosed in or on either of the first enclosure or the second enclosure;

wherein the control device generates the value of a parameter based on the measured light intensity values in the first and the second measurements;

wherein the control device compares the value of the parameter with a predetermined threshold value of the parameter;

wherein the control device generates an alert signal based on the comparison; and wherein the control device communicates the alert signal to a user device or to a server computer via the one or more antennae.

19. The apparatus of claim 17 wherein the filter apparatus further comprising one or more antennae;

wherein the one or more antennae are enclosed in or on either the first enclosure or the second enclosure;

wherein the control device sends the measured light intensity values in the first and the second measurements to a computer system via the one or more antennae;

wherein the computer system generates the value of a parameter based on the measured light intensity values in the first and the second measurements;

wherein the computer system compares the value of the parameter with a predetermined threshold value of the parameter;

wherein the computer system generates an alert signal based on the comparison; and wherein the computer system communicates the alert signal to a user device.

20. The apparatus of claim 17 wherein the apparatus further comprising an external computer system;

wherein the computer system receives the light intensity values from the control device;

wherein the computer system calculates a first lifespan value based on the light intensity values;

wherein the computer system receives a second set of light intensity values from a second control device in a second apparatus;

wherein the computer system calculates a second lifespan value based on the second set of light intensity values;

wherein the computer system generates a heat map based on a statistical analysis of the first and the second lifespan values; and wherein the computer system communicates the map to a user.

21. The apparatus of claim 16 wherein the connection device comprising one or more of power, control and data link wires; a first connector; and a second connector;

wherein the one or more of power, control and data link wires couple the first connector and the second connector;

wherein the first enclosure comprises a third connector and the second enclosure comprises a fourth connector;

wherein the first connector connects with the third connector and the second connecter connects the fourth connector when the connection device is coupled with the first enclosure and the second enclosure; and wherein the first enclosure and the second enclosure having been coupled by the connection device couple the power supply device, the control device, the first actuator, and the one of the light source system and the light sensor system in the first enclosure with the second actuator and the other of the light source system and the light sensor system in the second enclosure via the of power, control and data link wires.

22. The apparatus of claim 21 wherein the power, control and data link wires are laminated in a substantially flat ribbon or a sleeve.

23. A method for measuring particle size dependent efficiency of a filter using a filter apparatus comprising the steps of:

mounting the filter apparatus on a frame of the filter or on a location of a duct of an HVAC system where the filter is installed;

placing a light source system at a first location in close proximity to a first side of a membrane of the filter responsive to one or more actuation control signals received from a control device included in the filter apparatus;

placing a light sensor system at a second location in close proximity to a second side opposite to the first side of the membrane and facing the light source system responsive to the one or more actuation control signals;

generating light of a first wavelength selected from two or more distinct wavelengths responsive to one or more light source system activation signals;

measuring a first value of the intensity of a portion of light of the first wavelength generated by the light source system and transmitted through the filter responsive to one or more light sensor system activation signals;

generating light of a second wavelength selected from the two or more distinct wavelengths responsive to the one or more light source system activation signals;

measuring a second value of the intensity of a portion of light of the second wavelength generated by the light source system and transmitted through the filter responsive to the one or more light sensor system activation signals;

placing the light source system at a third location in close proximity to the first side of the membrane responsive to the one or more actuation control signals;

placing the light sensor system at a fourth location in close proximity to the second side of the membrane and facing the light source system in the third location responsive to the one or more actuation control signals;

generating light of the first wavelength responsive to the one or more light source system activation signals;

measuring a third value of the intensity of a portion of light of the first wavelength generated by the light source system in the third location and transmitted through the filter responsive to the one or more light sensor system activation signals;

generating light of the second wavelength responsive to the one or more light source system activation signals received from the control device;

measuring a fourth value of the intensity of a portion of light of the second wavelength generated by the light source system in the third location and transmitted through the filter responsive to the one or more light sensor system activation signals;

generating the value of a first particle size efficiency parameter based on the first value and the third value;

generating the value of a second particle size efficiency parameter based on the second value and the fourth value; and generating a filter status alert based on the value of the first particle size efficiency parameter and the value of the second particle size efficiency parameter.

24. The method of claim 23 further comprising:

generating the value of a first parameter based on the value of the intensity in the first measurement;

generating the value of a second parameter based on the value of the intensity in the second measurement;

comparing the value of the first parameter and the value of the second parameter with one or more of a predetermined threshold value of the first parameter and a predetermined threshold value of the second parameter; and generating and communicating a filter maintenance alert based on the comparison.

25. The method of claim 23 further comprising the steps of:

making a first comparison of the value of the first particle size efficiency parameter with a predetermined threshold value of the first particle size efficiency parameter;

making a second comparison of the value of the second particle size efficiency parameter with a predetermined threshold value of the second particle size efficiency parameter; and generating the filter status alert based on the first comparison and the second comparison.

26. The method of claim 23 further comprising the steps of:

selecting a light source device from two or more light source devices; and coupling the selected light source device with the control device responsive to the one or more light source system activation signals.

27. The method of claim 23 further comprising the steps of:

selecting a light sensor device from two or more light sensor devices; and coupling the selected light sensor device with the control device responsive to the one or more light sensor system activation signals.

28. The method of claim 23 further comprising the steps of:

generating the one or more actuation control signals by executing a computer program stored in a memory of the filter monitoring system;

generating the one or more light sensor system activation signals by executing the computer program; and generating the one or more light source system activation signals by executing the computer program.

* * * * *